United States Patent [19]
Hubert

[11] Patent Number: 4,963,205
[45] Date of Patent: Oct. 16, 1990

[54] EFFICIENCY PROCESS AND APPARATUS FOR EMBRITTLING AN OUTER PROTECTIVE COATING OF A PIPE OR PIPELINE

[75] Inventor: Jean-Luc Hubert, Willowbrook, Ill.

[73] Assignee: Liquid Air Corporation, Walnut Creek, Calif.

[21] Appl. No.: 434,814

[22] Filed: Nov. 13, 1989

[51] Int. Cl.[5] .............................................. B32B 31/24
[52] U.S. Cl. ........................................ 156/80; 62/62; 83/15; 83/170; 118/313; 156/344; 156/359; 156/498; 156/584; 225/93.5; 264/28; 427/398.3
[58] Field of Search ...................... 62/62; 83/15, 170; 156/80, 155, 344, 498, 584, 359; 225/93.5; 264/28; 118/313; 427/348, 398.3, 398.4

[56] References Cited

U.S. PATENT DOCUMENTS

| | | |
|---|---|---|
| 3,878,978 | 4/1975 | Martinek . |
| 3,934,379 | 1/1976 | Braton et al. ........................ 51/319 |
| 3,936,922 | 2/1976 | Blackstone et al. . |
| 4,220,012 | 9/1980 | Brister . |
| 4,255,216 | 3/1981 | Conant et al. . |
| 4,267,699 | 5/1981 | Bahrenburg . |
| 4,312,156 | 1/1982 | McWhorter . |
| 4,487,643 | 12/1984 | Ellett ...................................... 156/80 |
| 4,491,484 | 1/1985 | Williams . |
| 4,627,197 | 12/1986 | Klee et al. . |
| 4,654,107 | 3/1987 | Ritter . |

Primary Examiner—Robert A. Dawson
Attorney, Agent, or Firm—Oblon, Spivak, McClelland, Maier & Neustadt

[57] ABSTRACT

A protective coating on a pipe is embrittled by enclosing a portion of the pipe in a body defining an annular space around the protective coating. A pressurized LN2 cryogen is expanded within this annular space for sufficient time to lower the temperature of both the protective coating and the underlying pipe to a temperature below the temperature of embrittlement of the coating. The LN2 is expanded so as to form elliptical patterns on the pipe surface.

46 Claims, 26 Drawing Sheets

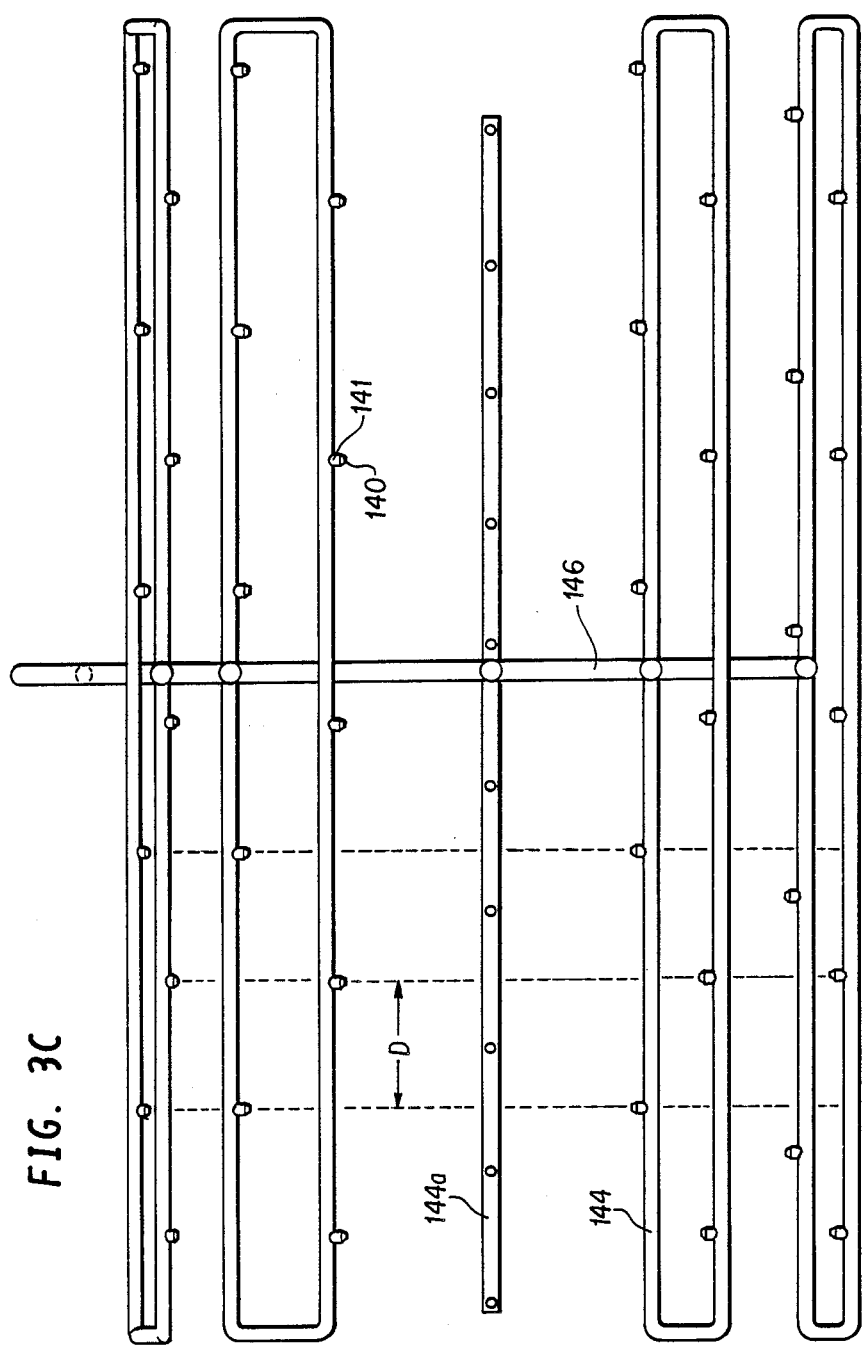

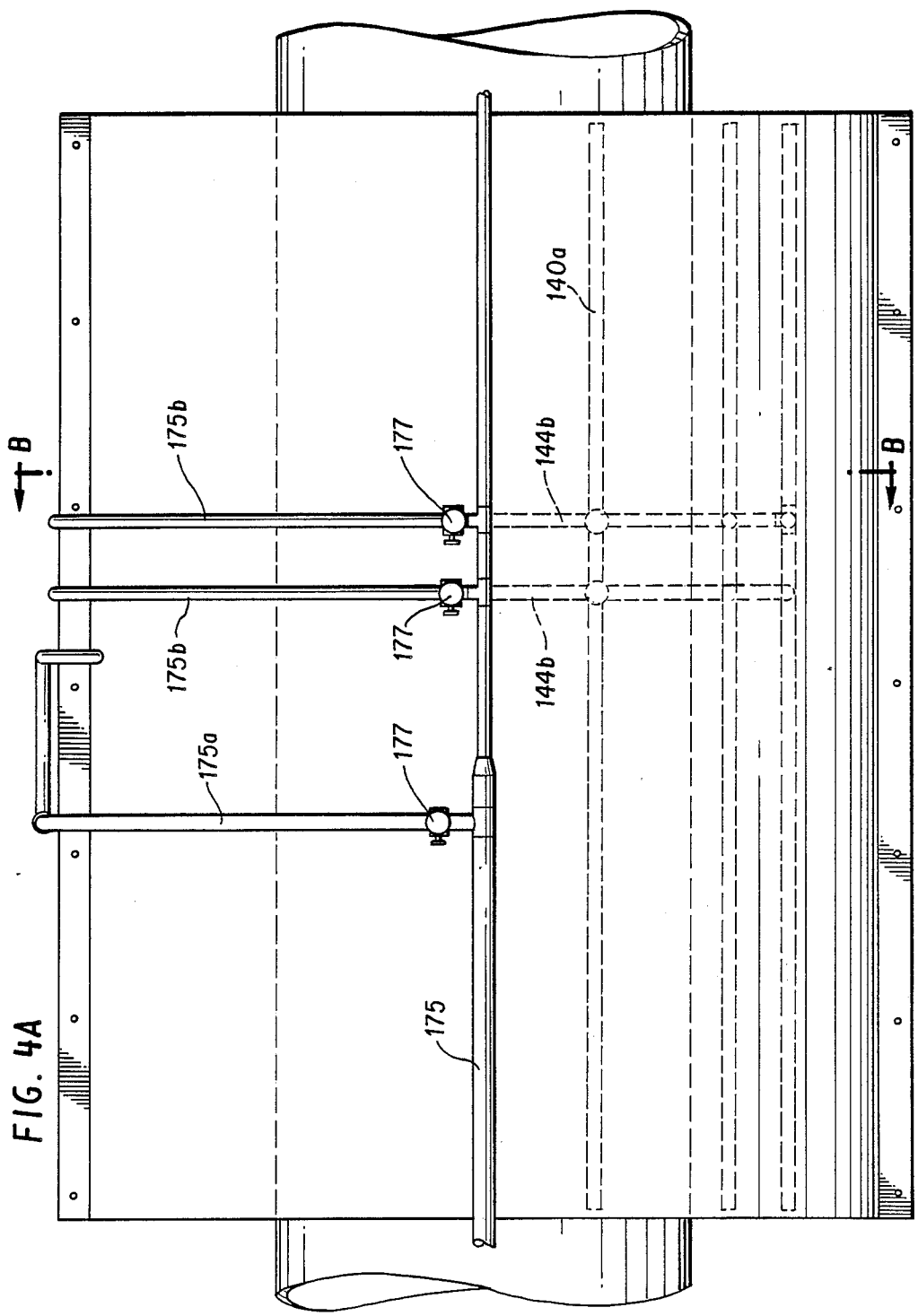

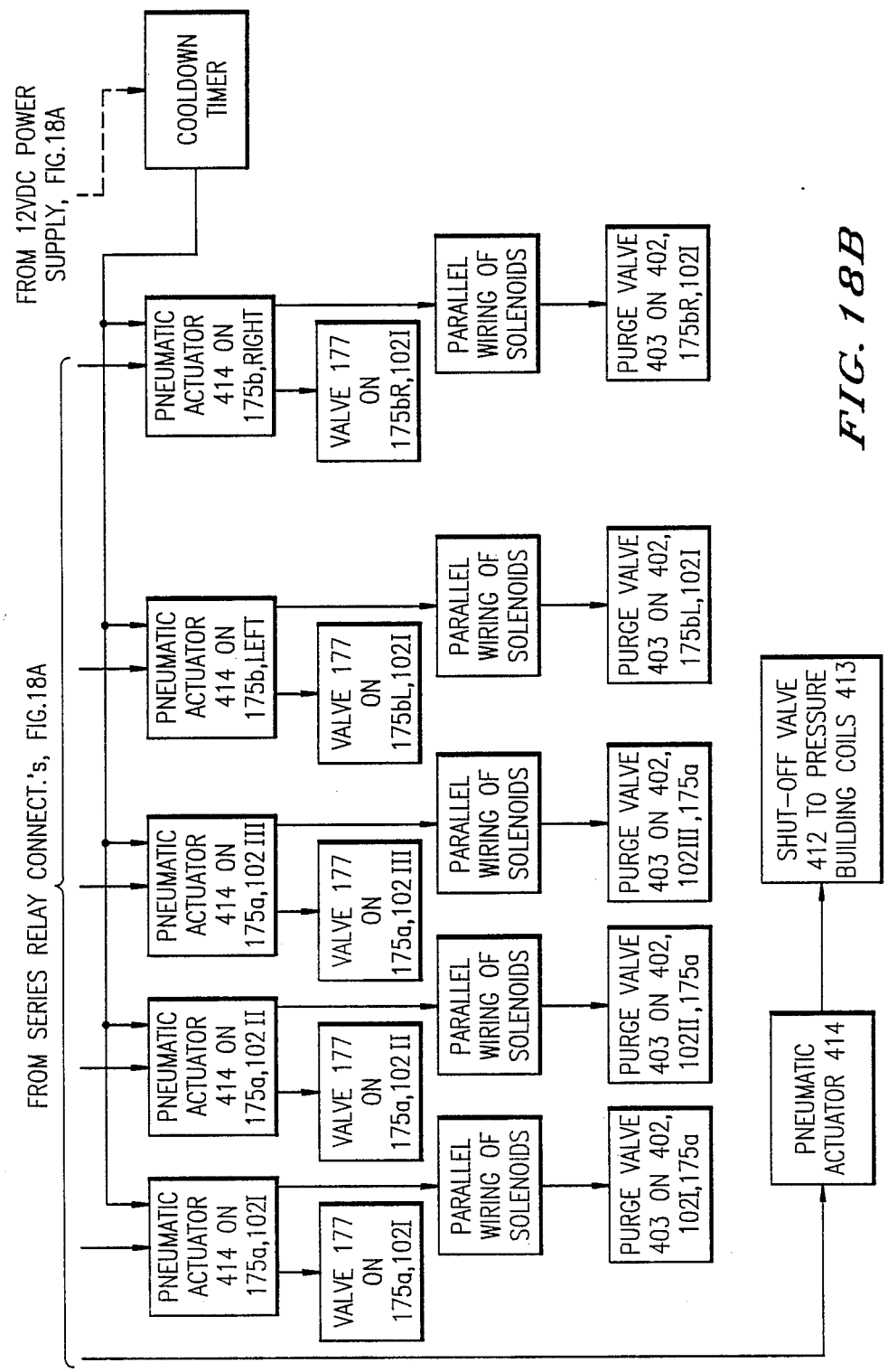

| MEASURED TEMPERATURE T IS: | SECTION I IS: | SECTION II IS: | SECTION III IS: | VAPORIZER VALVE IS: |
|---|---|---|---|---|
| ABOVE $T_o$ | OPEN | OPEN | OPEN | OPEN |
| DECREASING TO THE [$T_o$ -10°F, $T_o$] RANGE | OPEN | OPEN | OPEN | OPEN |
| DECREASING TO THE [$T_o$ -20°F, $T_o$ -10°F] RANGE | OPEN | OPEN | CLOSED | OPEN |
| DECREASING TO THE [-40°F, $T_o$ -20°F] RANGE | OPEN | CLOSED | CLOSED | OPEN, THEN CLOSED AFTER TIME DELAY |
| INCREASING TO THE [-40°F, $T_o$ -20°F] RANGE | CLOSED | CLOSED | CLOSED | CLOSED |
| INCREASING TO THE [$T_o$ -20°F, $T_o$ -10°F] RANGE | CLOSED OR OPEN * | CLOSED | CLOSED | CLOSED |
| INCREASING TO THE [$T_o$ -10°F, $T_o$] RANGE | OPEN | OPEN | CLOSED | OPEN |
| INCREASING TO ABOVE $T_o$ | OPEN | OPEN | OPEN | OPEN |

FIG. 20

* OPEN IF THE -40°F TEMPERATURE WAS NOT REACHED DURING THE PRECEDING TEMPERATURE HISTORY CYCLE. CLOSED IF IT WAS REACHED.

EFFICIENCY PROCESS AND APPARATUS FOR EMBRITTLING AN OUTER PROTECTIVE COATING OF A PIPE OR PIPELINE

BACKGROUND OF THE INVENTION

1. Field of the Invention

The present invention is directed to processes and apparatuses for embrittling an outer protective coating of a pipe or pipeline, and in particular processes and apparatus for the continuous embrittlement of such outer protective coatings at a speed matching that of typical pipeline traveling coating removing equipment.

2. Brief Description of the Related Art

U.S. patent application Ser. No. 07/265,772, filed on Nov. 1, 1988 by Hubert et al is herein incorporated by reference. This application discloses a pipeline traveling liquid nitrogen (LN2) spraying refrigeration tunnel which enables pipeline maintenance operations to proceed faster and with complete success in removing a coating from a pipe or pipeline, thereby allowing the unimpaired inspection of the pipe for the detection of dangerous corrosion pits and, if necessary, the selection of pipe sections that need to be replaced, in addition to providing a pipe surface clean enough for recoating.

The process and apparatus described in Hubert et al emphasize the simplicity of the LN2 tunnel, its incorporation into the typical pipeline traveling equipment, and its high speed of refrigeration. That speed, necessary to permit the tunnel of the length disclosed in Hubert et al to travel at the same speed as the typical pipeline traveling equipment, was achieved through spraying the coated pipe with a large number of wide, full cone nozzles, densely packed, uniformly distributed and close to the surface of the coated pipe, which resulted in very high heat transfer coefficients.

However, the high heat transfer coefficients of Hubert et al were achieved at the cost of low efficiencies. That is, a high average refrigeration speed (i.e., the average magnitude of temperature drop within the steel of the pipeline per unit dwell time; the coating experiences a much larger average temperature drop than the steel) was achieved at the expense of a high average refrigeration cost (i.e., the actual amount of LN2 necessary to drop the temperature within the steel of the pipeline on average per unit temperature and per unit area of sprayed surface) and of a low uniformity of the refrigeration field (i.e., the deviation of local temperature drops around the circumference of the pipe from the average temperature drop).

It was therefore considered to be desirable to reduce the LN2 consumption of the process and improve the uniformity of refrigeration without sacrificing, if possible, the refrigeration speed. The difficulty in satisfying all three of the above criteria is that techniques for improving one of the above criteria typically aggravate at least one of the other criteria. For example, an increase in the speed of refrigeration can be achieved by increasing the number of spraying nozzles and raising the injection pressure so as to increase the surfacic LN2 deposition rate. However, this typically increases the cost of refrigeration. For example, the flow rate of LN2 might be doubled while the refrigeration speed increases only by 50%, thereby resulting in a 50% efficiency loss.

SUMMARY OF THE INVENTION

It is an object of the present invention to provide a method for embrittling an outer protective coating of a pipe or pipeline while maintaining a high average refrigeration speed, together with a reduced average refrigeration cost and a high uniformity of refrigeration field.

It is another object of the present invention to provide an apparatus for embrittling an outer protective coating of a pipe or pipeline while maintaining a high average refrigeration speed, together with a reduced average refrigeration cost and a high uniformity of refrigeration field.

It is yet another object of the present invention to provide an apparatus for automatically controlling the discharge of LN2 refrigerant in an apparatus for embrittling an outer protective coating of a pipe or pipeline.

The above, and other, objects are achieved according to the present invention by a process for embrittling an outer protective coating of at least a pipe section of a transmission pipeline by the steps of enclosing a portion of the pipe in an open ended tunnel means so as to define an annular space around the protective coating, and expanding a pressurized LN2 cryogen into the space in such a way as to refrigerate the steel of the pipe or pipeline to the embrittlement temperature specific of the protective coating, thereby achieving embrittlement of the coating throughout its thickness, from the steel interface to the outer layers, by deposition of a layer of LN2 droplets onto the coated surface of the pipe, in which the deposition of the layer of LN2 droplets comprises spraying at least a part of the LN2 droplets onto the coating in such a manner as to form a plurality of LN2 patterns on the coating, the patterns having a surfacic area of less than 50% of the area of the coating on the pipe section, and preferably about 30% of such area.

According to another aspect of the invention, the above and other objects are achieved by an apparatus for embrittling an outer protective coating on the pipe, comprising an annular tunnel means having a bore positionable in enclosing relationship with a portion of a pipe so as to define an annular space with essentially open ends around the protective coating of the enclosed portion of the pipe, and means for expanding pressurized LN2 cryogen into the bore so as to refrigerate the steel of the pipe or pipeline to the embrittlement temperature specific of the protective coating, thereby achieving embrittlement of the coating throughout its thickness, from the steel interface to the outer layers, wherein the means for expanding comprise a plurality of nozzles comprising means for spraying at least a part of the LN2 cryogen so as to form a plurality of elliptical nitrogen patterns on the coating.

According to yet another feature of the invention, the above and other objects are achieved by an apparatus for embrittling an outer protective coating of a pipe, comprising an open-ended annular tunnel means comprising at least two tunnel bodies of different lengths, each of the tunnel bodies comprising two semi-cylindrical insulated body halves releasably connected to one another to define a bore positionable in enclosing relationship with a portion of a pipe so as to define an annular space around the protective coating of the enclosed portion of the pipe, and means for expanding pressurized LN2 cryogen into the bore so as to refrigerate the steel of the pipe or pipeline to the embrittlement temperature specific of the protective coating, thereby achieving embrittlement of the coating throughout its thickness, from the steel interface to the outer layers.

According to yet another aspect of the invention, the above and other objects are achieved according to the present invention by an apparatus for embrittling an outer protective coating of a pipe, comprising an annular tunnel means having a bore positionable in enclosing relationship with a portion of a pipe so as to define an annular space with essentially open ends around the protective coating of the enclosed portion of the pipe, means for expanding pressurized LN2 cryogen into the bore so as to refrigerate the steel of the pipe or pipeline to the embrittlement temperature specific of the protective coating, thereby achieving embrittlement of the coating throughout its thickness, from the steel interface to the outer layers, and control means for automatically shutting off a supply of the LN2 cryogen to the expanding means when at least one of the conditions of the tunnel means being stationary with respect to a pipe in the bore and the temperature of the pipe being below a first predetermined temperature, is met.

According to yet another aspect of the invention, the above and other objects are achieved according to the present invention by an apparatus for embrittling the outer protective coating of a pipe, comprising annular tunnel means comprised of at least two rigid coaxial cylinders having different lengths and connected end to end, the annular tunnel means defining a bore positionable in an enclosing relationship with a portion of a pipe so as to define an annular space with essentially open ends around the protective coating of the enclosed portion of the pipe, independent means associated with each of the cylinders for expanding pressurized LN2 cryogen into the bore so as to embrittle the protective coating throughout the thickness thereof, and control means for automatically and individually controlling a supply of LN2 to each of the independent expanding means so as to maintain the coating temperature at a predetermined optimum coating temperature for coating embrittlement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3C is a detail of the manifold and header system in the longest of the tunnel sections shown in FIGS. 2A and 2B;

FIG. 4A is an elevational view of a modified tunnel means, showing the backup nozzle system;

FIGS. 18A and 18B constitute a block diagram of the feedback control system of FIG. 15;

FIG. 20 is a chart showing the opening state of the valves for the various tunnel sections at different coating temperatures;

DETAILED DESCRIPTION OF THE PREFERRED EMBODIMENTS

Figure 1:
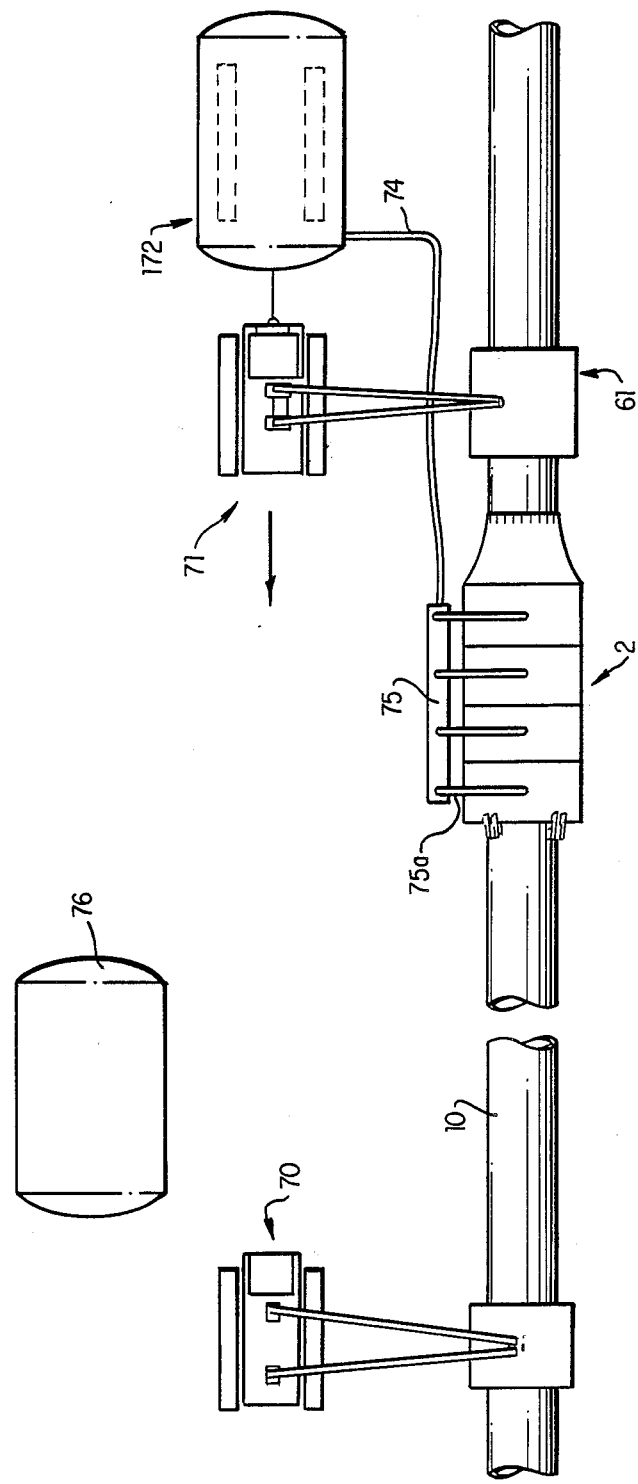
FIG. 1 is a schematic plan view of an apparatus required by the complete process, according to a first embodiment.

Generally, as is described in U.S. patent application Ser. No. 07/265,772, and as is illustrated in FIG. 1, tunnel means in the form of a rigid, insulated cylindrical tunnel body 2 is supplied with means for expanding pressurized LN2 cryogen into the bore of the tunnel body, including manifolds 75-75a. Subcooled LN2 cryogen is supplied to the manifold 75 from a storage tank 72 transported by a side boom 71, via a flexible hose 74. The side boom 71 also supports a scraper 61 which scrapes the cryogenically embrittled coating from the pipeline 10. Also illustrated in FIG. 1 are a side boom 70 in front of the tunnel means for lifting the pipeline in preparation for scraping, and an additional tank 76. Details of the construction of the tunnel means and the means for expanding pressurized LN2 cryogen into the bore thereof are described in detail in said U.S. patent application Ser. No. 07/265,772.

The embodiment of the tunnel means, as schematically shown in FIG. 1 and described in U.S. patent application Ser. No. 07/265,772, is preferably used for cryogenically embrittling coatings on 24 inch diameter pipes, except as described below. The coatings on 30 inch diameter pipes are preferably cryogenically embrittled by tunnel means such as is illustrated in FIGS. 2A, 2B, 3A and 3C.

Figure 3A:
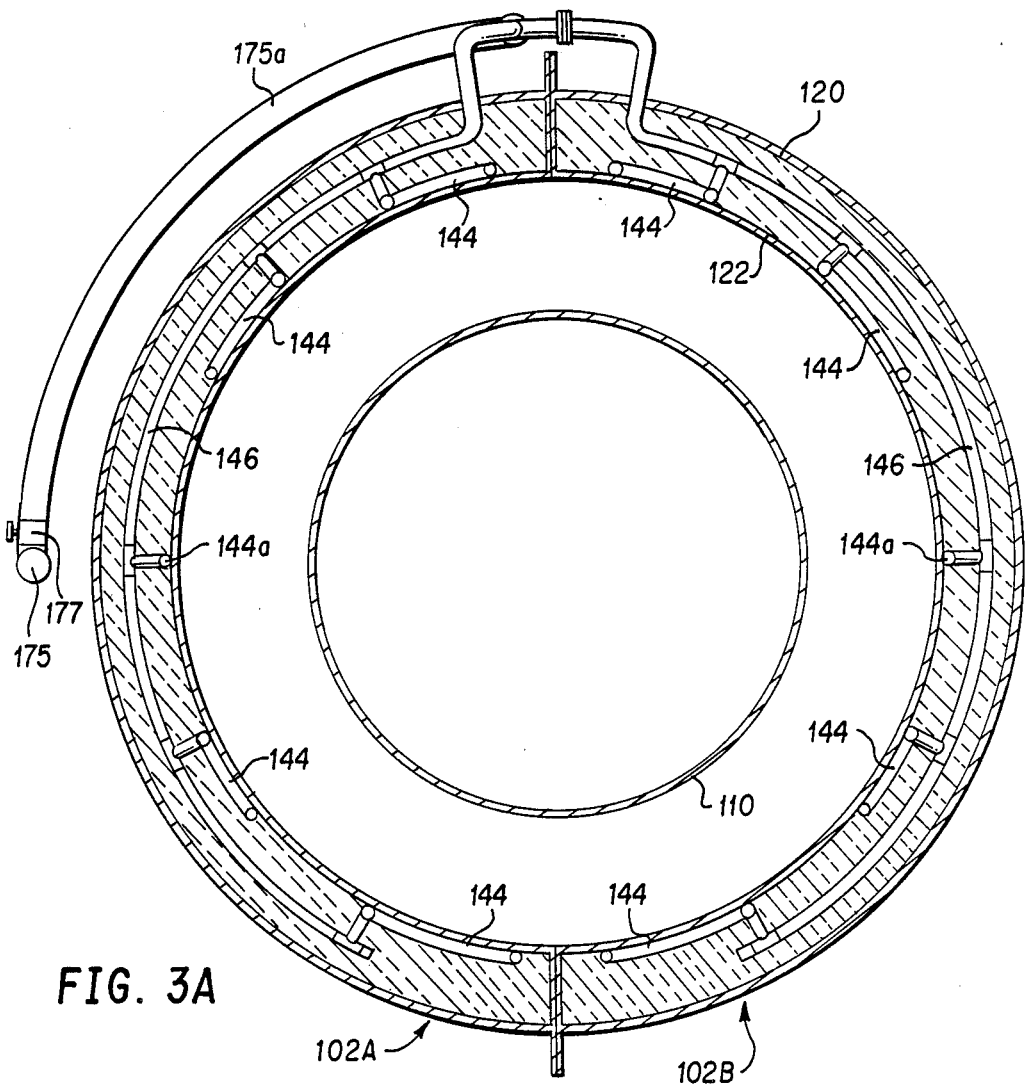
FIG. 3A is a sectional view through line III—III in FIG. 2A.

The apparatus according to this second embodiment also has as a main component an essentially open-ended tunnel means which is formed of a rigid, insulated cylindrical tunnel body 102, defined by two semi-cylindrical body halves 102a and 102b, which are bolted together (FIG. 3A). Each of the body halves 102a and 102b is formed of a semi-cylindrical rigid outer shell 120 and a coaxial, semi-cylindrical rigid inner shell 122, each of which may be formed of aluminum between which is positioned a rigid insulating material 124, for example foam in place polyurethane insulation. The two body halves are preferably bolted together around a section of a pipe 110 whose coating is to be embrittled throughout its thickness by refrigerating the steel base (pipe 110) to the embrittlement temperature specific of the coating and where the coating is subsequently removed by standard pipeline traveling scraper equipment.

Figure 2A:
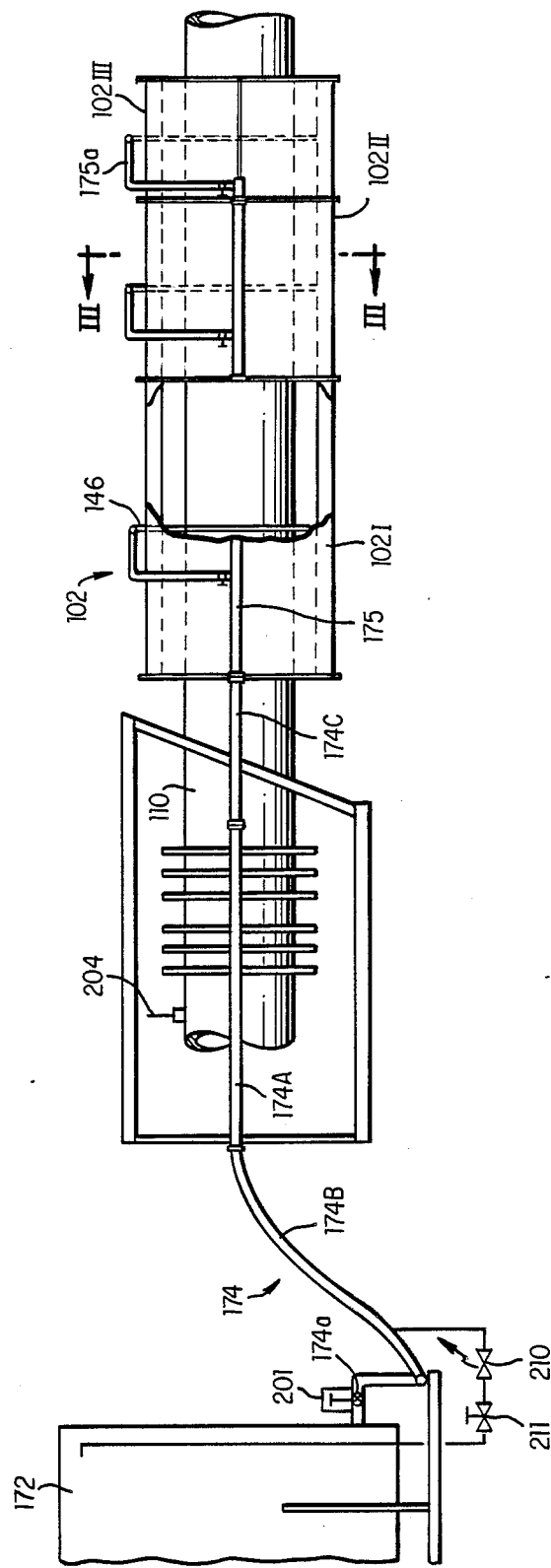
FIG. 2A is an elevation view, partly in section, of a tunnel means according to a second embodiment.
Figure 2B:
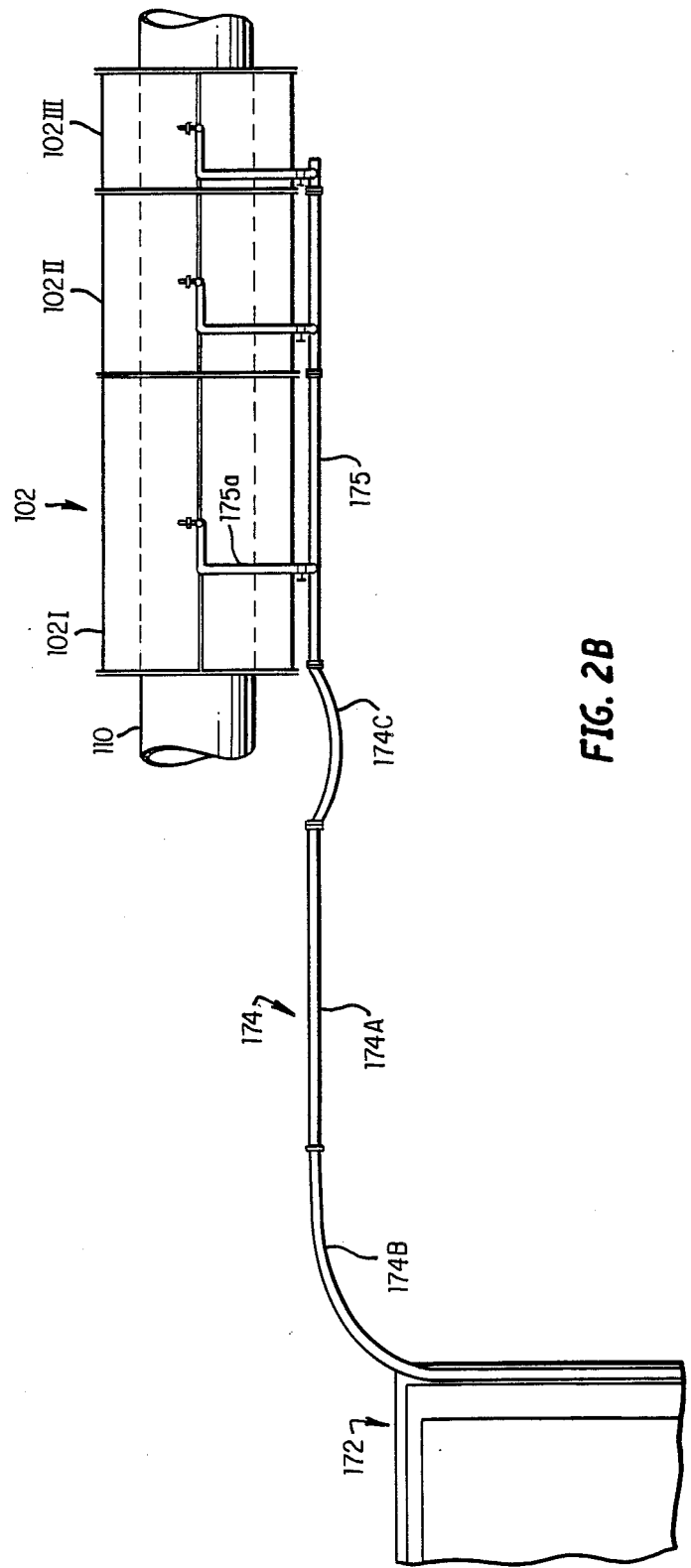
FIG. 2B is a plan view corresponding to FIGURE 2A.
Figure 3B:
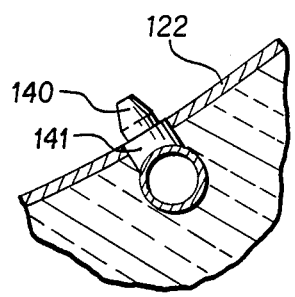
FIG. 3B is a detail of the nozzle of FIG. 3A.

The LN2 is supplied from a storage tank 172 via a hose 174 having insulated rigid pipe segment 174A and insulated flexible hose segments 174B and 174C. The hose 174 connects to an insulated axial manifold 175 (FIGS. 2A and 2B). Insulated circumferential manifold portions 175a connect to the semi-circular manifolds 146 in each of the body halves 102a and 102b (FIG. 3A). Each of the semi-circular manifolds 146 connects to, and supplies LN2 to, axially extending linear header 144a, and axially extending loop headers 144 (not shown in FIG. 2A). The headers 144 and 144a extend axially within substantially all of the length of the body halves 102a and 102b and have, extending therefrom, radially inwardly directed pipe sections (half couplings) 141 which terminate at nozzles 140 directed inwardly toward the pipe section 110 enclosed by the tunnel body. For clarity, the half couplings and nozzles are not shown in FIG. 3A, but are shown in detail in FIG. 3B. The half couplings 141 extend to the inner shell 122 and the nozzles 14 extend through apertures in the inner shell. The nozzles 140 are mutually spaced along the length of the headers 144 and 144a (i.e., in the pipe and tunnel body axial direction) by a predetermined distance, i.e., multiples of a basic spray pattern cell width D, which may be 8 inches (FIG. 3C).

Figure 5:
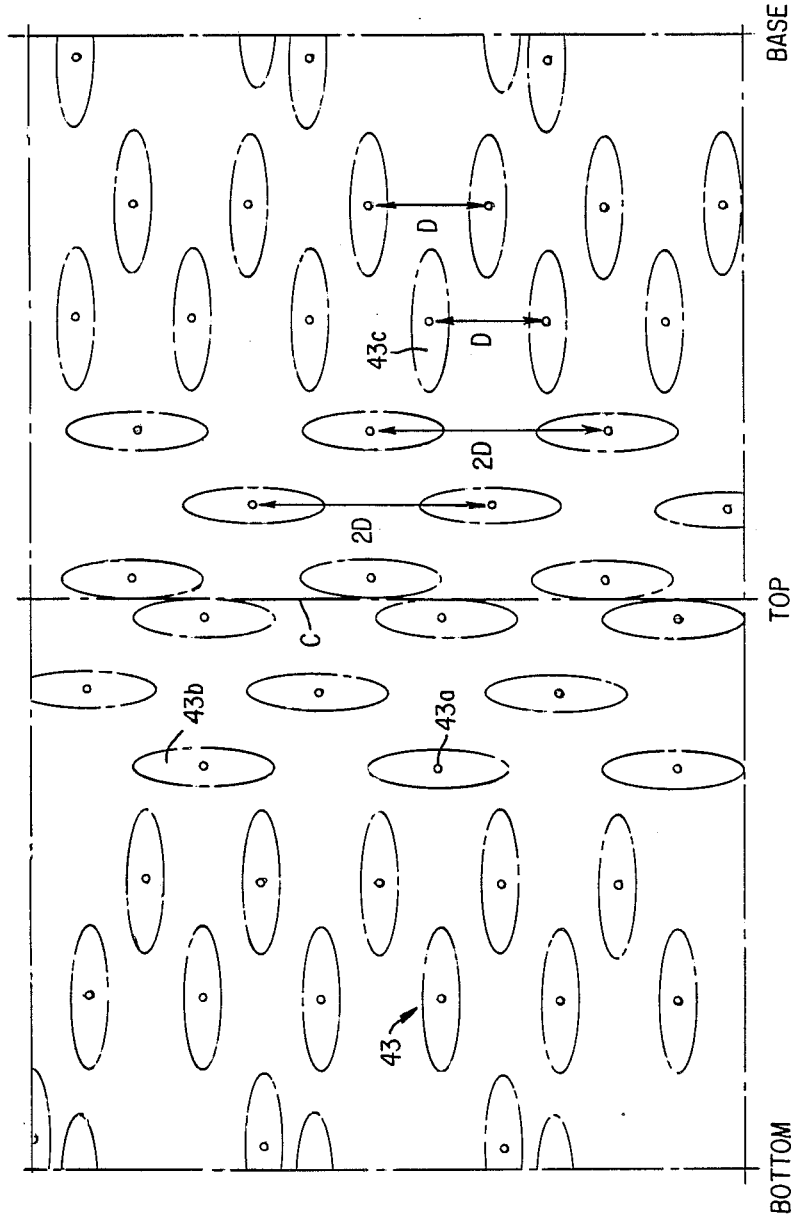
FIG. 5 shows the spray pattern according to the first embodiment.
Figure 6:
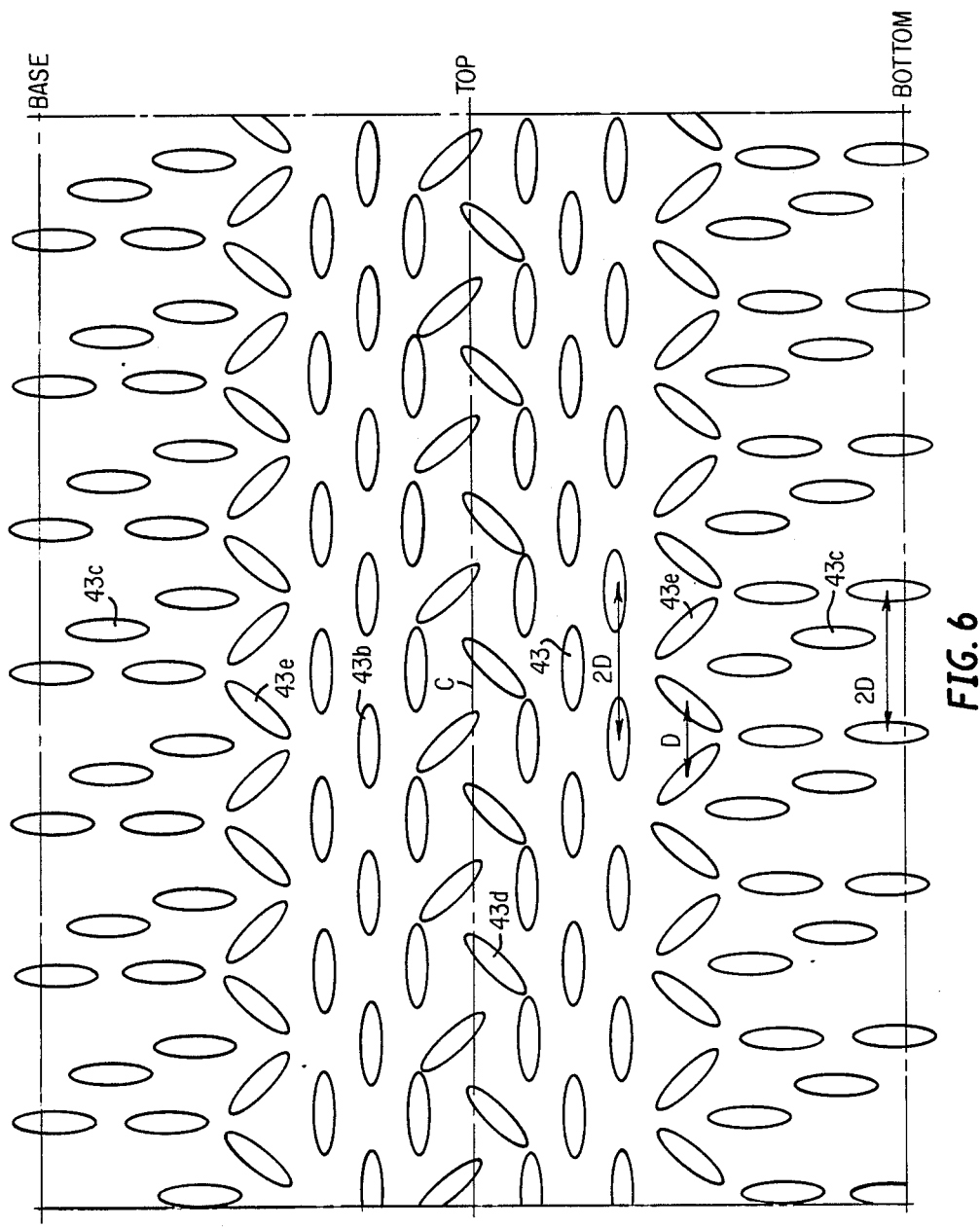
FIG. 6 shows the spray pattern according to the second embodiment.

According to the present invention, in both the first and second embodiments, the spray nozzles 140 are flat cone, wide angle, spray nozzles which produce elongate, elliptical spray patterns such as those shown in FIGS. 5 and 6. For example, the nozzles are preferably Spraying Systems VV11003 flat cone, wide angle, spray nozzles of 0.043 inch orifice diameter.

It has been found that this type and size of nozzle is preferable since it yields a better compromise between speed of refrigeration and cost of refrigeration than the type and size of nozzle used in the related application 07/265,772, (wide angle full cone nozzles) and since it yields a better compromise between speed of refrigeration and cost of refrigeration than flat cone nozzles of lesser spray angle and/or different orifice diameter.

It has been found that a spray height (distance from tip of nozzle 140 to outer surface of pipe coating) of approximately 6 inches (plus or minus one inch) is preferable to the spray height of 2.5" used in the related application 07/265,772 since the approximately 6" spray height reduces the excess LN2 and thereby increases the process efficiency and reduces the cost of refrigeration compared to a 2.5" spray height. A shorter spray height requires more nozzles to maintain a similar spray coverage on the pipe while the increased LN2 flow rate is not compensated by an increased refrigeration speed of equal or greater magnitude, thereby resulting in costlier refrigeration. A greater spray height results in a longer and wider tunnel (because of slower refrigeration and greater tunnel diameter), and not necessarily in greater efficiencies. It is also preferable that the injection pressure be between 14 and 27 psig, which yields the highest efficiencies.

Preferably, the nozzle density should be one for every 75 square inches of outer pipe surface (plus or minus 10%). It has been found that this nozzle density is preferable since it reduces the cost of refrigeration compared to the nozzle distribution (1 nozzle per 13 square inches) used in the related application 07/265,772.

FIG. 5 is a developed view showing elliptical spray patterns 43 sprayed by the nozzles 140 on the coating of a 4 foot section of pipe 110 of 24 inch diameter according to the first embodiment of the present invention. In FIG. 5, the central dots 43a indicate the positions of the spray nozzles 140 relative to the pipe coating. As can be seen, the nozzles are spaced by twice the basic cell width D (16 inches in this case), or by the basic cell width D (8 inches).

An important feature of the invention is that the spray surfacic coverage of the coated pipe is substantially less than 100%. It should in fact be less than 50%, preferably between 15% and 45% and ideally around 30%. It has been found that the elliptical spray patterns of the present invention permit a uniform embrittlement of the coating with such a low surfacic coverage for the reasons set forth below. For this purpose, the elliptical spray patterns should be between 8 and 11 inches long (major axis), and between 2 and 4 inches wide (minor axis), to provide a spray pattern having an area of between 12.6 and 34.5 square inches per pattern. The spray size is determined by a combination of the nozzle type and the distance (preferably 6 inches) separating the nozzle tips from the coating.

It can be seen from FIG. 5 that all of the spray patterns 43 are elliptical. However, the major axes of the elliptical spray patterns 43 are not all parallel to one another. Some of the elliptical spray patterns 43b have axially extending major axes (i.e., parallel to the pipe axis), while other spray patterns 43c have circumferentially extending major axes (i.e., normal to the pipe axis).

According to the invention, those spray patterns 43b on the upper half of the pipe coating (i.e., centered at points within 90° on either side of top axial line C) preferably have major axes extending parallel to the pipe axis, whereas the spray patterns 43c on the lower half of the pipe coating preferably have major axes extending circumferentially on the pipe. Moreover, the nozzles 140 mounted on adjacent ones of the linear headers (i.e., those producing rows of patterns spaced in the circumferential direction of the pipe) are mutually staggered, while the nozzle distribution is such that the nozzle density is significantly lower than that needed to achieve complete coverage of spray patterns on the entirety of the pipe coating surface.

The spray pattern shown in FIG. 5 provides the following effects. The excess LN2 (i.e., the LN2 that is not vaporized immediately upon impingement) from the LN2 sprayed to form the patterns 43b flows circumferentially downward along towards the sides of the pipe, due to gravity, i.e., in a direction away from the axial top center line C. The axial orientation of the major axes of the patterns 43b thus increases the axial "spread" for this flow, thereby maximizing surface coverage. Similarly, the staggered orientation of the circumferentially spaced rows of patterns 43b assures that the flow from one row of patterns will fill the interstices between the patterns 43b of the adjacent row.

In contrast, excess LN2 from the spray patterns 43c on the lower half of the pipe is more likely to drip from the coating than to flow along the coating surface. Therefore, the axial spacing between the nozzles 140 is reduced to the basic cell width D and the staggered spray patterns 43c have major axes extending circumferentially. This permits an increase in the density of the spray patterns to compensate for the loss of LN2 by dripping.

The spray pattern of FIG. 6 is intended for 30 inch diameter pipes according to the second embodiment of the present invention. It also has axially extending spray patterns 43b (in second circumferential regions) and circumferentially extending spray patterns 43c (in a fourth circumferential region). However, it differs from the embodiment of FIG. 5 in the following respects:

Immediately adjacent the top center line C, there is a first circumferential region with a greater spacing between adjacent patterns 43d, and these patterns 43d have major axes extending 45° from the pipe axis (although any other inclined angle greater than 0° and less than 45° could also be used). Preferably, the bottom of each spray pattern 43d (i.e., that end furthest from center line C) points towards the direction of travel of the tunnel means while the top of each spray pattern 43d (i.e., that end closest to center line C) points away from the direction of travel of the tunnel means. This minimizes the surface area of the spray pattern precisely on the top center line C where flow of excess LN2 is minimal. It also avoids excessive preferential spraying of one upper quarter of the pipe versus the other upper quarter when the top of the tunnel body is not precisely aligned with the top of the pipe.

The spray patterns 43e at third circumferential regions at the sides of the pipe (approximately 90° spaced from either side of the top center line C) also have major axes inclined 45° from the longitudinal axis (although any angle less than 90° and greater than 45° from the pipe axis could instead be used). The adjacent patterns 43e are oriented to form V-shapes. Preferably, the V shapes formed by each pair of the spray patterns 43e are centered on the spray patterns 43b of the row of 43b spray patterns immediately above (i.e., toward center line C) the row of spray patterns 43e. This has been found to increase the residency time of the excess LN2 on the upper half of the pipe.

According to a further feature of the invention, the tunnel body can be formed of sections whose active lengths, i.e., length excluding flanges, can be variable and correspond to multiples of the basic spray pattern cell width D. For example, in the case of a basic spray pattern cell width of 8 inches, tunnels having lengths of 2 feet, 8 inches; 4 feet; and 6 feet, 8 inches can be provided. This is shown in FIGS. 2A and 2B, in which the tunnel body 102 is formed of three sections bolted together end to end, i.e., section 102I having a 6 foot, 8 inch length; section 102II, having a 4 foot length, and section 102III, having a 2 foot, 8 inch length. The total length of the tunnel body should be selected so as to correspond to the length necessary to reduce the temperature of a ⅜ inch thick steel pipe, coated with a 60 mil coating, by an average of 60° F. when moving at 12 feet per minute with a low to medium LN2 injection pressure of 14 to 20 psig.

It has been found that the arrangement of axially extending headers 144 or 144a and circumferentially extending manifolds 146 is preferable with the low density of nozzles provided according to the invention since it is lighter and uses significantly less piping than that in the related application 07/265,772. The construction of the tunnel means is also much simpler since only 2 semi-circular manifold pipes 146 are required for each tunnel section (6 altogether for three sections). The formation of the headers 144a as loops avoids the formation of gas pockets at the ends of the headers and improves flow distribution between nozzles.

According to a further feature of the invention, since the lengths of the tunnel body sections 102I through 102III are different, and the lengths of the headers are different, the danger exists of variable spray pressures in each of the tunnel body sections. Therefore, the piping of each of the tunnel body sections is sized such that pressure changes due to friction and elevation changes are roughly equal at a given elevation and small (less than 2 psig) even at maximum flow rate (30 psig tank head pressure) throughout the tunnel body, i.e., the LN2 flow velocity and static pressure at one given header inlet is approximately the same in each of the three sections. With such sizing, all three tunnel sections generate the same LN2 spraying process and therefore the same refrigeration process. An example is given in Table 1 below:

TABLE 1

|  | 6'8" Section | 4' Section | 2'8" Section |
| --- | --- | --- | --- |
| Manifold 146 | 1¼" | 1" | ¾" |
| Manifold 175a | 1¼" | 1¼" | 1" |
| Axial Manifold 175 |  |  |  |
| before section branch | 2.5" | 1.5" | 1" |
| after section branch | 1.5" | 1" | — |

Figure 4B:
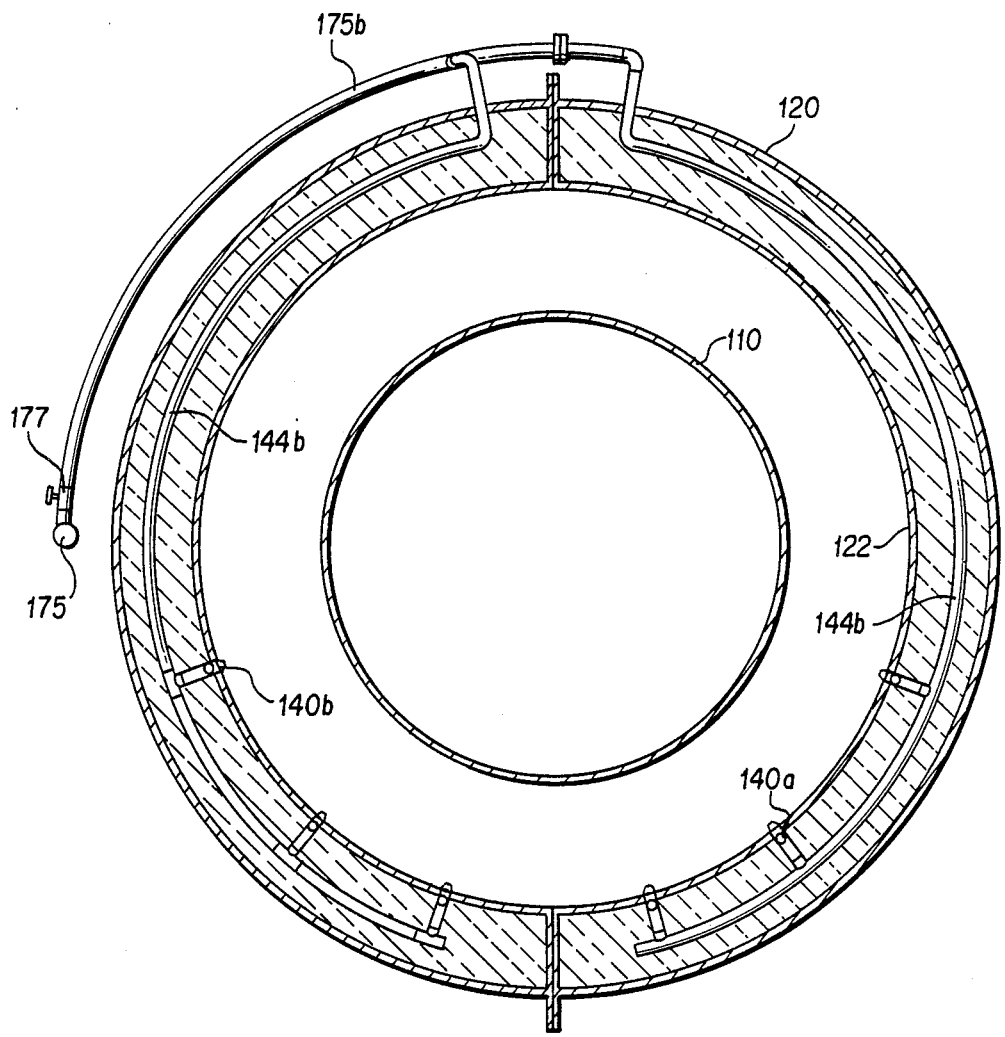
FIG. 4B is a section through line B-B in FIG. 4A.
Figure 7:
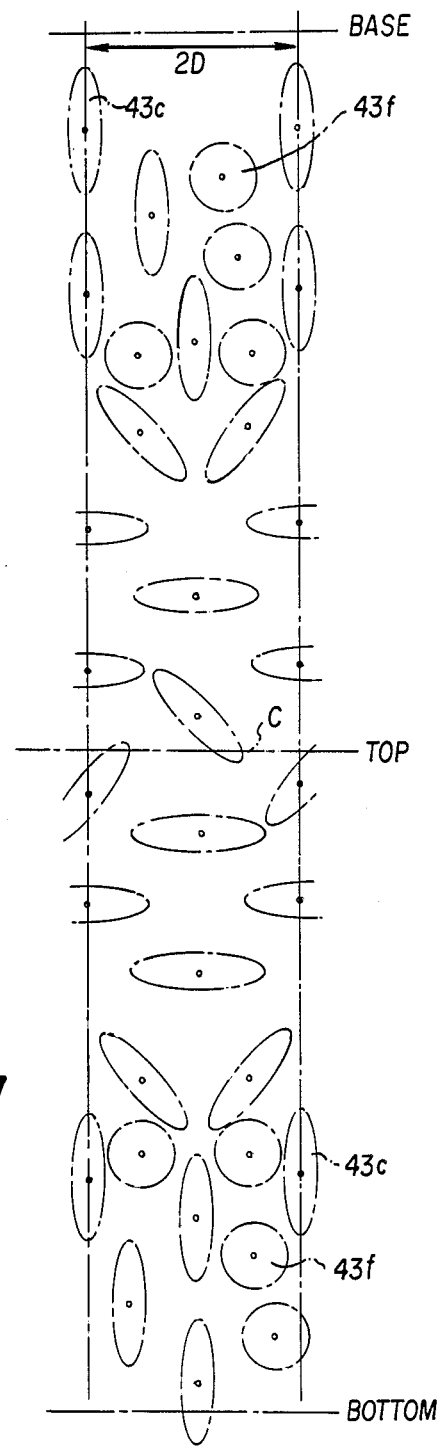
FIG. 7 shows the relationship between the patterns from the main nozzles and the backup nozzles.

It has been found that the spray nozzles 140 create a greater degree of refrigeration on the upper half of the pipe than on the bottom half of the pipe. This non-uniformity is normally desirable because the lower half of the pipe typically is at an initially lower temperature than the upper half, due to no direct sun exposure and a thinner and damaged coating caused by the lifting of the pipe by the side-boom 70. However, for some applications additional refrigeration is desired for the bottom half of the pipe. For this reason, one or more of the tunnel sections can have backup spray nozzles, as illustrated in FIGS. 4A and 4B. In the preferred embodiment, the backup spray system is provided in tunnel body section 102I. It consists of backup spray nozzles 140b mounted on axially extending branch headers 140a supplied by semi-circular manifolds 144b. The LN2 is applied to the manifolds 144b by circumferentially extending manifolds 175b, connected to the axial manifold 175. As best seen in FIG. 4B, however, the nozzles 140b are positioned only in the lower half of the tunnel section. The backup nozzles 140b should have a density of about 1 per 95 square inches of pipe outer bottom half surface. The backup nozzles preferably are wide angle, full cone, nozzles such as Bete WL-1/4-120 nozzles. Their preferable distribution is shown in FIG. 7 which shows an axial width of 2D. That is, they form circular spray patterns 43f in voids between the elliptical spray patterns 43c and 43e.

Each of the circumferentially extending manifolds 175a and 175b has a ball valve 177 located as close to the axial manifold 175 as possible, in order to avoid the formation of gas pockets in the manifold 175a or 175b when any one ball valve 177 is closed, which would produce pulsations in the sprayed LN2 of the operating tunnel sections. This produces a modular construction whereby the flow of LN2 to selected ones of the tunnel sections can be shut off, to produce great flexibility in the rate of refrigeration for any given processing speed and operating pressure. The illustrated design permits the tunnel operator to choose between 20%, 30%, 50%, 70%, 80% and 100% of the maximum refrigeration capability. Moreover, the operator can vary the amount of refrigeration continuously, plus or minus 18% at any of the above listed 6 levels, by varying the operating pressure within specified limits of between 15 and 29 psig, while maintaining roughly constant efficiency (plus or minus 1% absolute variation).

Trap doors 200 can be fitted at the bottom of each of the tunnel sections in order to enable removal of coating debris that may accumulate at the bottom of the tunnel after processing hundreds of feet of pipeline. Although most of the coating will be removed by the scraper, loose or damaged patches of coating may be separated from the pipe solely by the kinetic energy of the LN2 expansion jets combined with the refrigeration and subsequent embrittlement and contraction caused by LN2 impingement. Accumulation of this debris at the bottom of the tunnel sections could lead over time to a blockage of the LN2 sprays from the bottom nozzles and therefore to an unacceptable loss of refrigeration on the bottom portions of the pipe. Without the trap doors, cleaning could only be accomplished by dismantling the tunnel section halves which would be time and labor consuming.

Figure 21:
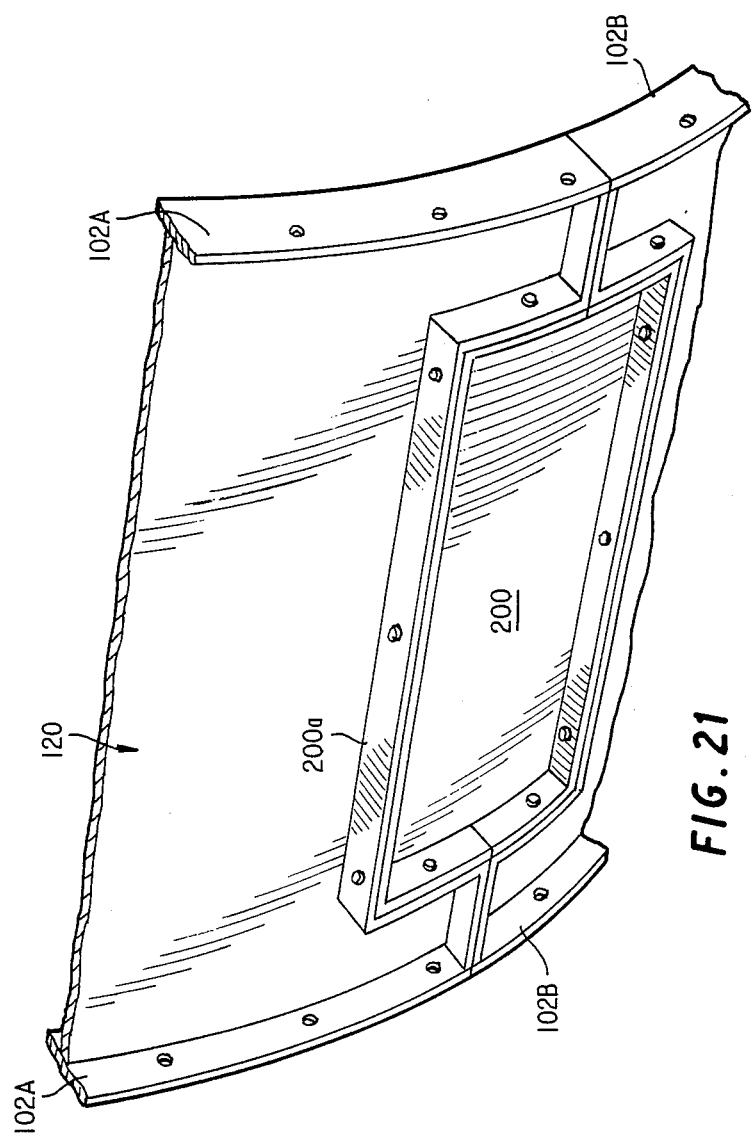
FIG. 21 is an external detail of the trap door.
Figure 22:
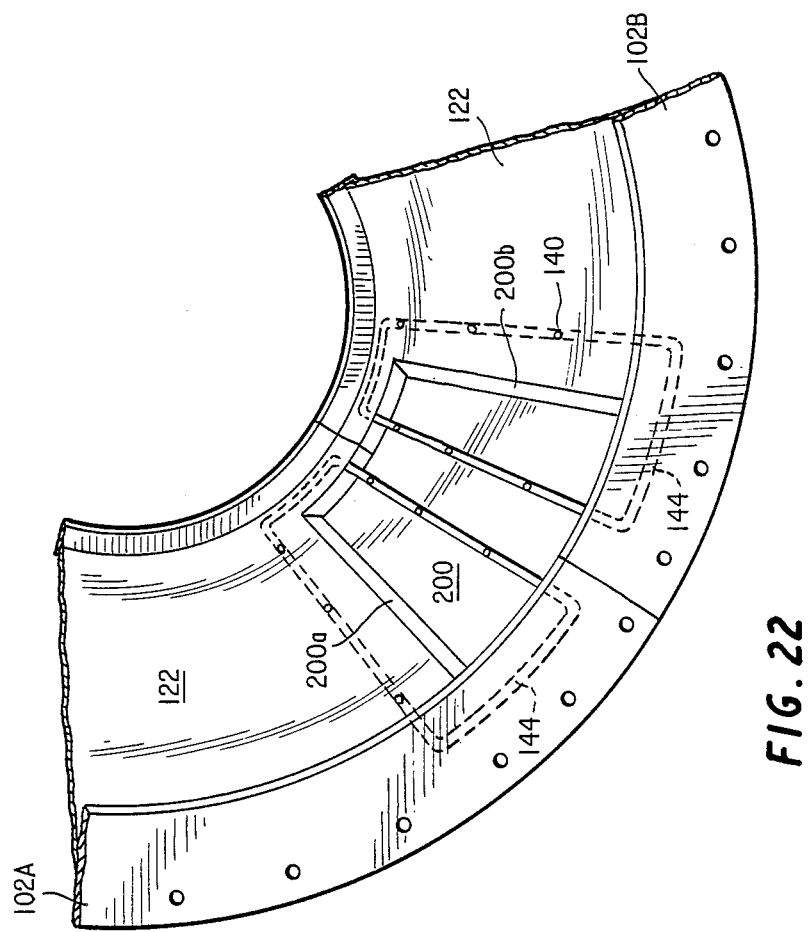
FIG. 22 is an internal detail of the trap door.

The trap door 200 is shown in greater detail in FIGS. 21 and 22. An opening for the trapped door extends axially for a substantial portion of the length of the tunnel section at the joint between the two tunnels halves 102A and 102B. The opening is defined by a flange 200b extending between the inner and outer shells, and extended by an external flange 200a. The trap door 200 is bolted to the external flange 200a as is best seen in FIG. 22.

Figure 8:
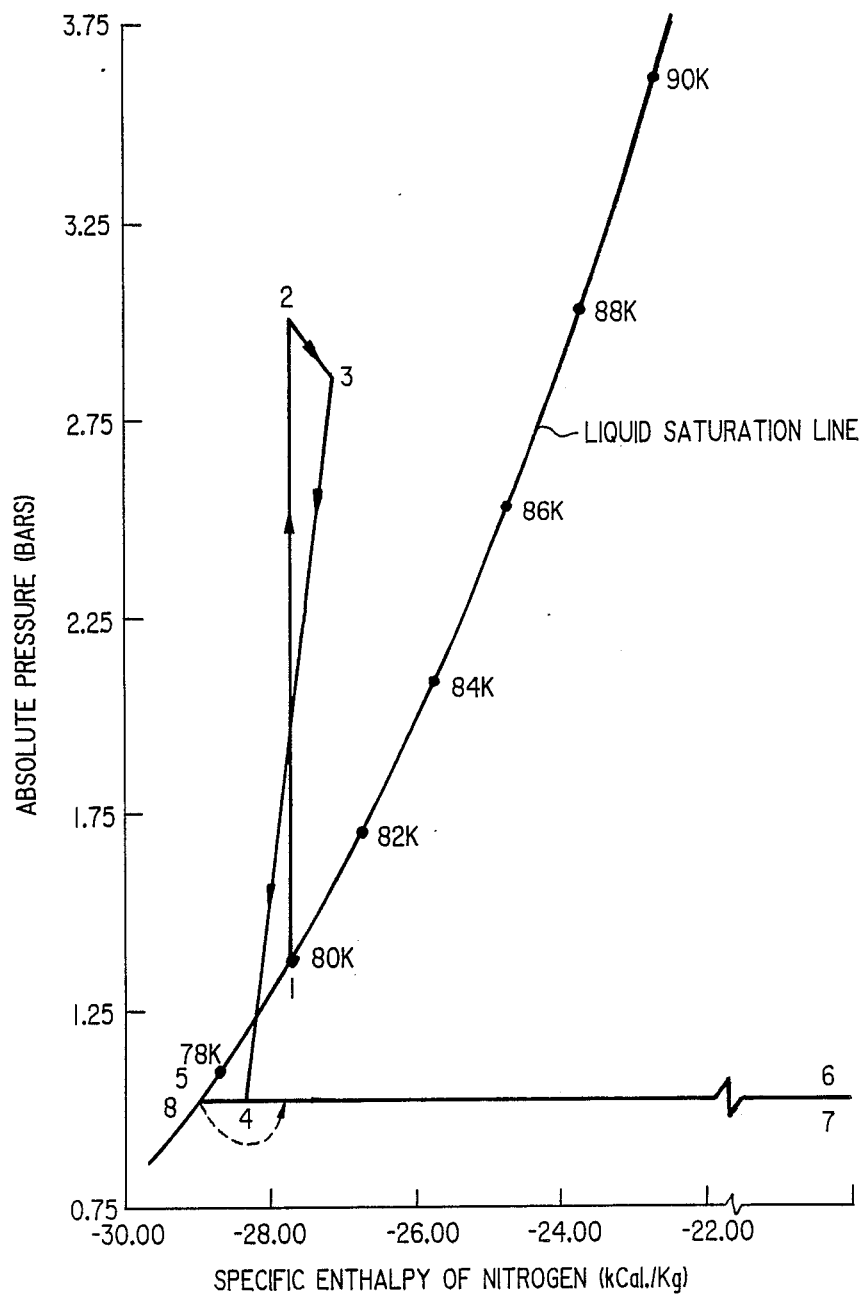
FIG. 8 shows the thermodynamic path of LN2 sprayed according to the present invention.

The LN2 follows a given thermodynamical path which can be best represented on a (H,P) Mollier diagram, said path being function of how the tunnel is operated (tank head pressure, number of sections used) and of the location in the LN2 piping network. FIG. 8 graphically shows this path. The various points on that diagram are:

Point 1 is an initial state of LN2 in mobile storage tank 172 after fill-up: saturated liquid at 1.37 bars (about 5 psig), hence at 80K (about $-316°$ F.) temperature, $-27.699$ kcal/kg enthalpy (enthalpy 0 reference is at perfect gas, 0 K, 1 atm) and 0.6948 kcal/kg.K entropy (entropy 0 reference = enthalpy 0 reference).

Point 2 is a state of LN2 in storage tank 172 after pressurization to 3 bars (about 29 psig). Since the pressurization is rapid, the LN2 bath within the tank does not have the time to warm up to the equilibrium temperature of 88 K corresponding to 3 bars. The pressurization process is approximated as being isothermal (at 80 K). Hence, specific enthalpy and entropy at state 2 are respectively $-27.679$ kcal/kg (enthalpy increases by 0.07%) and 0.6948 kcal/kg.K.

Point 3 is a state of LN2 at the top header 144 of any tunnel section after a frictional and elevational pressure change of 0.138 bars (about 2 psig) and a heat input of 0.55 kcal/kg (about 1 Btu/lb) between storage tank outlet and top header inlet through the piping network as designed and sized and covered by 1" of insulation of 0.10 W/m.K heat conductivity. Specific enthalpy of LN2 is now $-27.123$ kcal/kg at a pressure of 2.862 bars which corresponds to a temperature of about 81.2 K and an entropy of about 0.7027 kcal/kg.K.

Point 4 is a state of the nitrogen after sudden depressurization through the nozzles 140, between 2.862 bars and 1.01325 bars. That type of depressurization is usually considered isentropic rather than isenthalpic because of the fast kinetics (but it is only an approximation of the actual process). Given the saturated liquid and gas entropies at atmospheric pressure, the expanded LN2 separates into 98.6% liquid and 1.4% gas. If approximated by an isenthalpic expansion, the mass proportions of liquid and gas would be respectively 96% and 4%. In any case, between and 99% of the nitrogen goes towards point 5 (saturated liquid at atmospheric pressure) and the rest goes towards point 6 (saturated gas at atmospheric pressure).

Point 7 is the same point as point number 6, but corresponds to the vaporization of the fraction of the LN2 that has been vaporized upon impingement on the coated pipe and upon the flow of excess $LN_2$ along the coated pipe (order of magnitude of the fraction=60%).

Point 8 is the same point as point number 5, but corresponds to the portion of LN2 that was not vaporized on the pipe and is lost without an excess LN2 recovery system.

EXAMPLE 1

Single Coating Layer

A 4' tunnel for 24" $\phi$ pipe with the inventive LN2 spraying means was used to refrigerate a $\frac{3}{8}$" thick, 24" $\phi$ steel pipe coated with a layer of coal tar tape (specifically TAPECOAT®20, from the Tapecoat Company, Illinois) applied in an overlapping cigarette wrap. That coating consists of a high tensile strength fabric completely saturated with coal tar pitch and is 58±2 mils thick. Target was to lower the steel temperature from around 100° F. to around 40° F., thereby ensuring that the coating has a steel interface temperature of around 40° F. (or less if there is a thermal contact resistance between steel and coating) and a temperature throughout its thickness decreasing from around 40° F. at the steel interface to significantly less than 0° F. at its outer surface where LN2 impingement occurs (because of the low heat conductivity of the coating, there is a sharp and non-linear temperature gradient throughout the coating thickness during the LN2 spraying phase, followed by a temperature equilibration that requires 60 seconds or more), which ensures that the specific type of coating has been embrittled throughout its thickness.

The tunnel body producing the spray pattern of FIG. 5 was moved at 3.33 feet/min, which corresponds to a 72 seconds long spraying process on any portion of the pipe. Flow rate of LN2 was measured at 56 lbs/min (1" Hoffer cryogenic turbine flowmeter) which yields a specific consumption of 16.8 lbs/foot of pipe or 2.52 gal LN2/foot of pipe.

Figure 9:
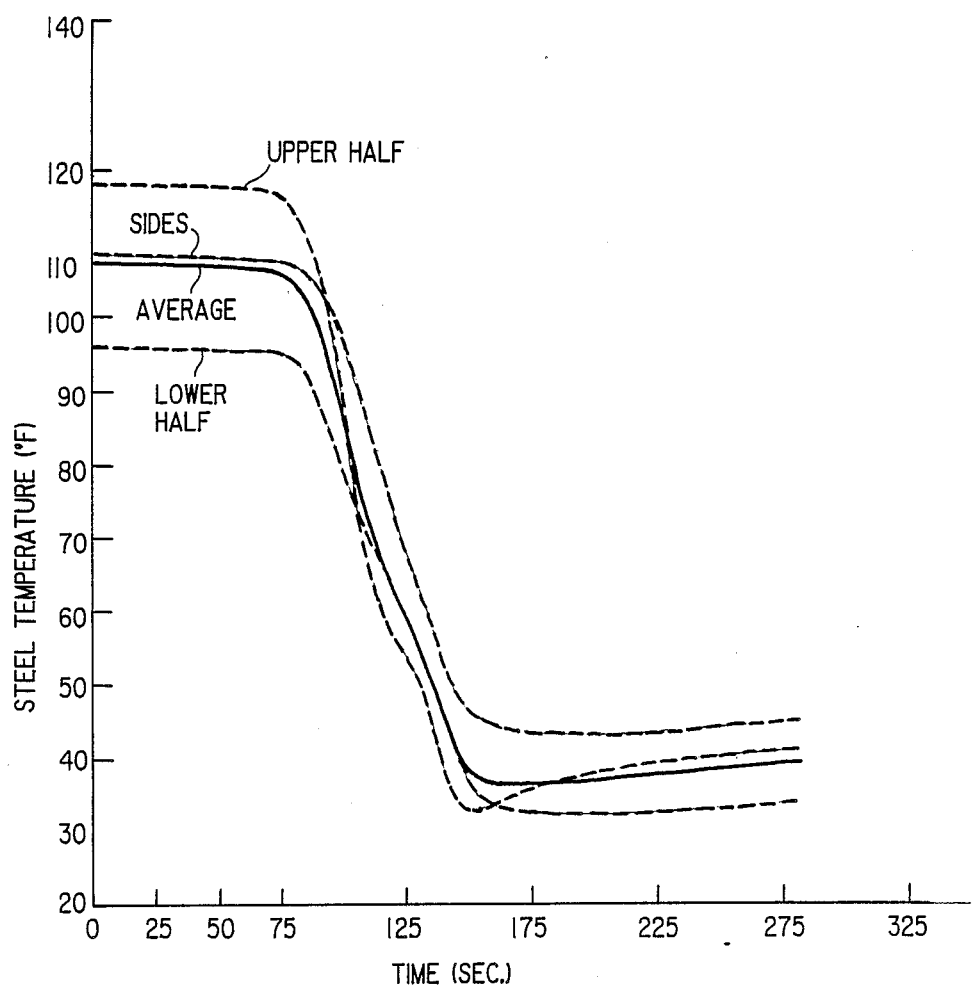
FIG. 9 shows the drop in steel temperature according to one example of the invention.

The average steel temperature drop was estimated at 70.9° F. (FIG. 9) from the indications of 13 thermocouples which yields a surface heat removal rate estimated at 108.3 Btu/min.sqft of outer pipe surface. Comparing the surface heat removal rate with the surface LN2 deposition rate (2.23 lbs LN2/min.sqft) times the vaporization heat of LN2 (83.7 Btu/lb for 4 psig equilibrium LN2) yields the efficiency of the process, namely 58%. The initial temperature of the steel was:

117° F. on upper 135° segment (average of 6 thermocouples)

107° F. on the two 45° side segments (average of 4 thermocouples)

95° F. on the bottom 135° segment (average of 3 thermocouples).

The final temperature (immediately after spraying) of the steel was:

33° F. on upper segment (average of 6 thermocouples)

45° F. on the side segments (average of 4 thermocouples)

33° F. on bottom segment (average of 3 thermocouples)

Extrapolating those data to a 65° F. average temperature drop on a 30" diameter, 11/32" thick steel pipe (coated with a damaged layer, 70 to 100 mils thick, of coal tar) yields a specific consumption of 3.4 gal LN2/foot of pipe. Actual testing with the earlier design of the tunnel (Example 1 of U.S. patent application 07/265,772) showed a consumption of 6.2 gal LN2/foot of pipe (established over 270 feet of pipe). The gain from the new LN2 spraying means is therefore very significant.

EXAMPLE 2

Double Layer of Coating

Obviously, thicker coatings increase the insulation of the pipe and make it that much more difficult to refrigerate the steel. Increased dwell times are necessary to compensate for the slower heat transmission through the coating, and specific consumptions are higher.

The tunnel of Example 1 was moved at 2.67 feet/min which corresponds to a 90 second long spraying process on any portion of a 24" φ steel pipe ⅜" thick with 116 mil coating (same type of coating as Example 1 but applied in two layers). Flow rate of LN2 was measured at 56 lbs/min. (17.9 psig tank head pressure) which yields a specific consumption of 21.0 lbs. LN2/foot or 3.15 gal. LN2/foot.

Figure 10:
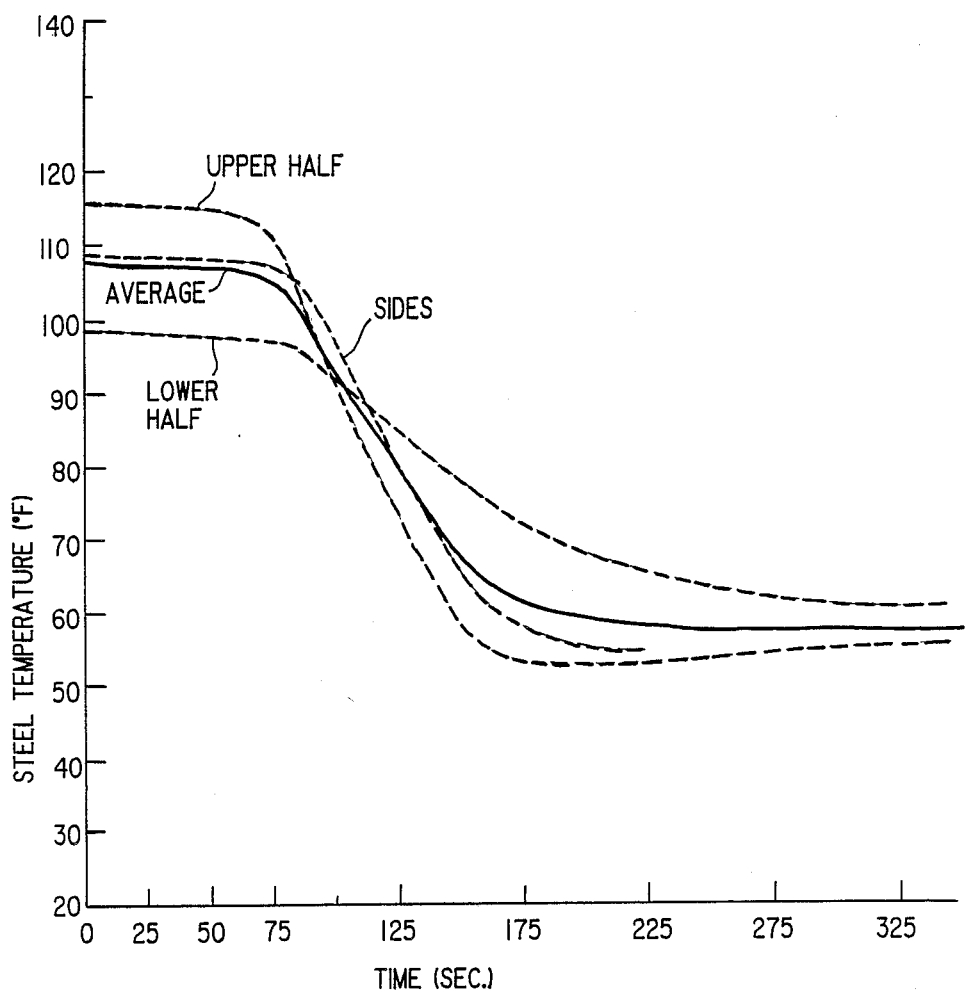
FIG. 10 shows the drop in steel temperature according to a second example of the invention.

The average steel temperature drop (FIG. 10) was estimated at 43.8° F. immediately after spraying and at 48.1° F. after 40 second equilibration which yields a surface heat removal rate of 72.5 Btu/sqft.min and an efficiency of 39%.

The initial temperature of the steel was:

115° F. on upper 135° segment (average of 6 thermocouples)

108° F. on 2 side 45° segments (average of 4 thermocouples)

98° F. on bottom 135° segment (average of 2 thermocouples)

The final temperature (40 seconds after end of spraying) of the steel was:

52° F. on upper segment (average of 6 thermocouples)

55° F. on sides segments (average of 4 thermocouples)

67° F. on bottom segment (average of 2 thermocouples)

It is obvious from this example that an additional or back-up bottom refrigeration capability, as is now incorporated in the 30" φ pipe tunnel design, is very useful on thick coatings.

EXAMPLE 3

Damaged Double Layer of Coating

Under field conditions, the coatings are seldom of uniform thickness and of smooth surface, but are usually damaged. It can be expected that a damaged coating will enable a faster and more efficient refrigeration of the steel.

The tunnel of Example 1 was moved at 2.29 feet/min which corresponds to a 105 seconds long spraying process, along a 24" φ⅜" thick steel pipe having a damaged 116 mil coating (same type of coating as Example 1 but applied in 2 layers). Flow rate of liquid nitrogen was measured at 56 lbs/min. (17.5 psig tank head pressure) which yields a specific consumption of 24.5 lbs LN2/foot or 3.67 gal LN2/foot.

The double layer of coating had been artificially damaged. The results listed below are only indicative of the effect that a damaged coating can have on the efficiency of the process.

Figure 11:
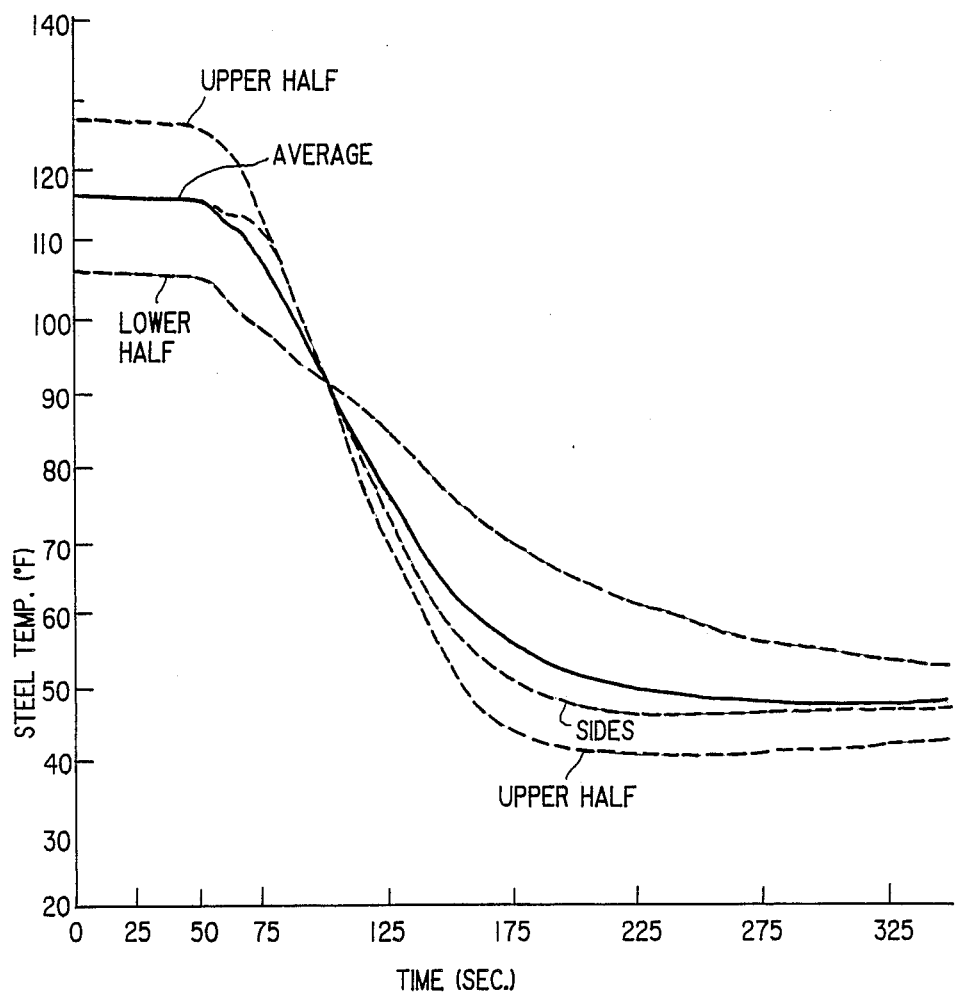
FIG. 11 shows the drop in steel temperature according to a third example of the invention.

The average steel temperature drop (FIG. 11) was estimated at 59.1° F. after spraying, but at 65.6° F. after 40 seconds equilibration, which yields a surfacic heat removal rate of 80.00 Btus/sqft min and an efficiency of 43%. The initial temperature of the steel was:

126° F. on upper 135° segment (average of 5 thermocouples)

116° F. on 2 side 45° segments (average of 4 thermocouples)

106° F. on bottom 135° segment (average of 2 thermocouples)

The final temperature (40 seconds after end of spraying) of the steel was:

41° F. on upper segment (average of 5 thermocouples)

47° F. on 2 side segments (average of 4 thermocouples)

63° F. on bottom segment (average of 2 thermocouples)

COMPARISON BETWEEN EXAMPLES 1, 2, AND 3

Figure 12:
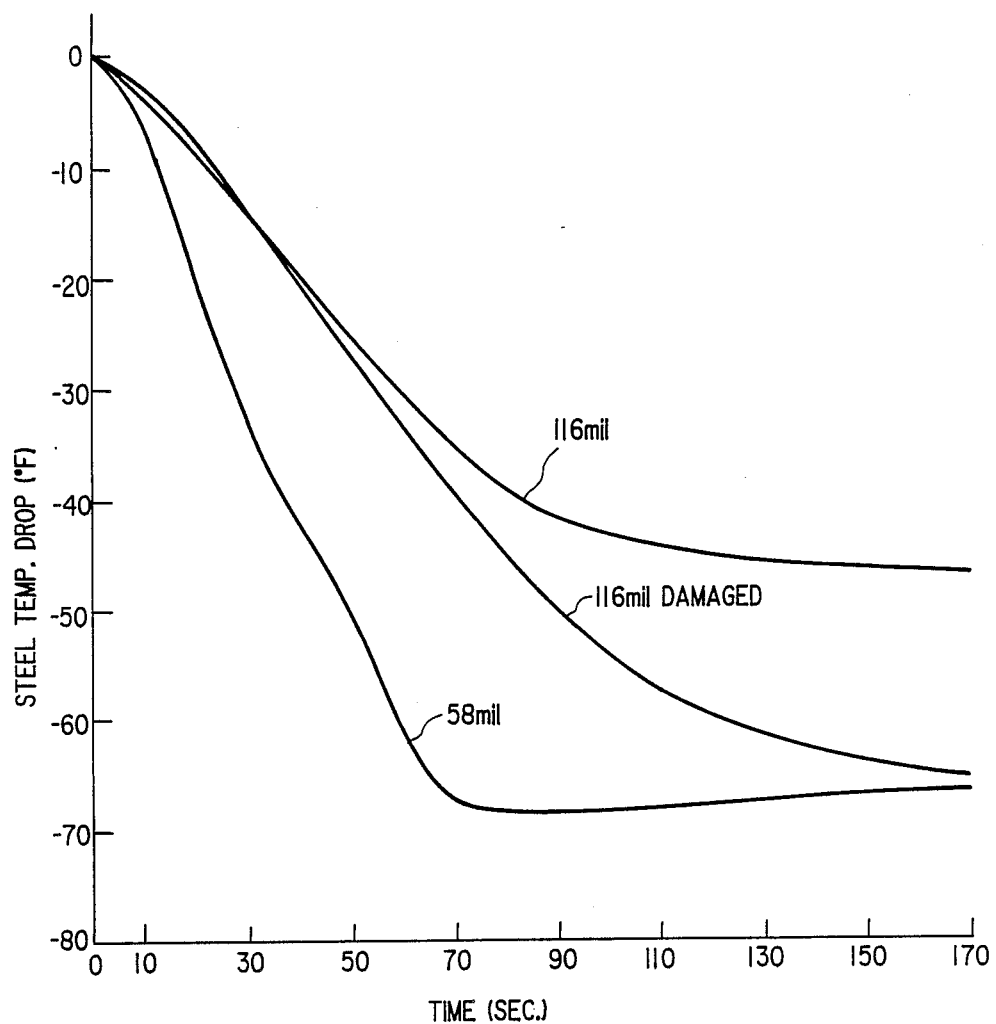
FIG. 12 shows the comparison between drop in steel average temperature from the preceding three examples.

The results of these tests can be compared (FIG. 12) based on average refrigeration speed and average refrigeration cost. Those numbers are listed below and show clearly the detrimental effect of increasing coating thickness and the beneficial effect of a damaged coating, a state that can be expected under field conditions. For the double layer tests, the temperatures of the steel after a 40 seconds equilibration are used since it is believed that they lead to a better estimate of the average steel temperature (equilibration between warm and cold spots).

|  | Average Refrigeration Speed [°F./min] | Average Refrigeration Cost [lbs LN2/foot °F.] |
|---|---|---|
| (1) 58 mils | 59.1 | 0.237 |
| (2) 116 mils undamaged | 32.0 | 0.437 |
| (3) 116 mils damaged | 37.5 | 0.374 |
| Examples (2) versus (1) | −46% | +84% |
| Examples (3) versus (2) | +17% | −14% |

Although a comprehensive feedback type control of the spray system is not necessary, a feedback system is desired (mostly for safety reasons by ensuring that the pipe will not transition from ductile to brittle) to maintain the pipe temperature above a certain range and to shut-off the LN2 supply to the tunnel whenever the tunnel body has stopped moving. For this purpose, a cryogenic ball type shut off valve 174a is fitted in the line 174 immediately downstream from the supply tank 172. The shut-off valve 174a is fitted with a pneumatic actuator with spring return 201, such as, but not limited to, the Worcester Model 2039S. The flow of a compressed air control gas to the pneumatic actuator 201 is controlled by a solenoid valve controlled by a two set point temperature controller of control unit 202 which can operate in a hysteresis mode, such as, but not limited to, the Newport Q 2401K controller. The control unit 202 receives pipe temperature signals from a temperature sensor 204, which can be a "brush" thermocouple such as the model 4BKS from JMS Southeast mounted to the rear of the scraper 161, although other temperature sensors may be used.

The control unit 202 also receives motion signals from a motion detector 206 which monitors the relative motion between the tunnel body 102 and the pipe 110. The motion detector may be mounted on the main drive shaft of the scraping machine and have an output relay connected in series with the output relay of the controller. For example, the motion detector can be, but is not limited to, a model DR 1000 from ElectroSensors. The detected temperatures can be recorded by delivering temperature signals from the control unit 202 to a temperature recorder 208, such as an Omega RD-2082 recorder or the like. All equipment used in the simplified feedback system is 12 V DC powered, the power source being batteries located on the platform of the mobile storage tank 172. In addition, the system and apparatus are intrinsically fail-safe, both for the personnel in the vicinity and for the steel of the pipe, since in the event of power loss, the springs of the spring return actuator 201 automatically close the shut-off valve 174a since the solenoid of 201 is a normally closed type and will shut off the compressed air supply to the actuator.

It is important to avoid decreasing the temperature of the steel pipe to less than a selected first threshold temperature $T_{TH1}$, which may be $-40°$ F. or higher. The reason for this precaution is the ductile to brittle transition of the usual pipeline steel at temperatures around $-40°$ F. The two set point control unit 202 therefore controls the opening and closing of the shut-off valve 174a during continuous operation (during stationary apparatus cool-down and travel out of the cool down zone, the feedback system is bypassed by a timer such as but not limited to the Q4 series of National Controls) according to the following criteria:

1. If the measured temperature $T_n$ is above the lower set point $T_{TH1}$, the shut-off valve 174a is kept open.
2. If $T_n$ is below $T_{TH1}$, valve 174a is closed.
3. Once the valve 174a has been closed at temperatures below $T_{TH1}$, it is not again reopened until $T_n$ reaches a higher, second set point temperature $T_{TH2}$, which is preferably 10° F. or more above $T_{TH1}$.

Figure 14:
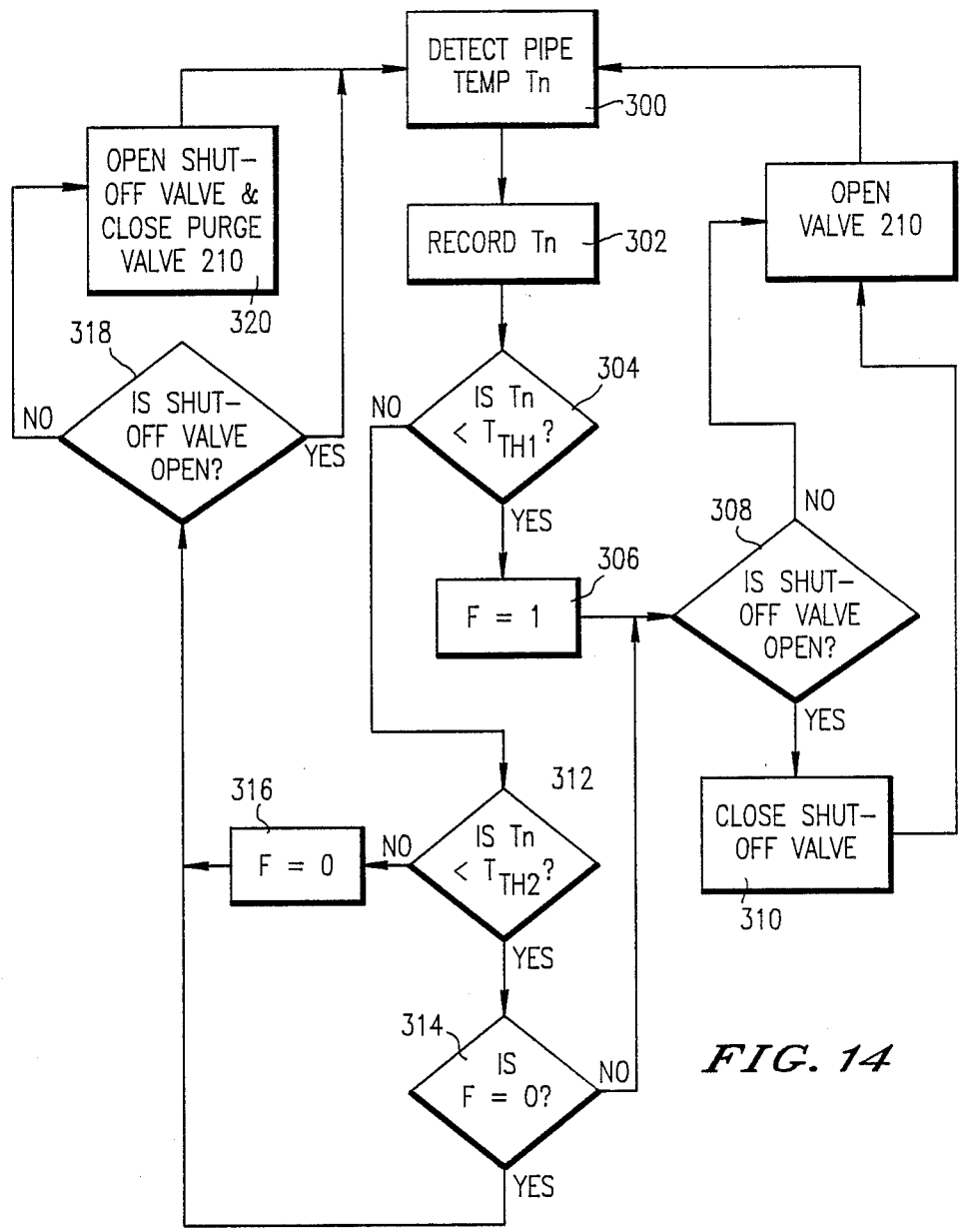
FIG. 14 is a flow chart showing an example of the control of the shut off valve.

FIG. 14 shows a possible operational mode for the control unit 202. Following detection and recording of $T_n$ in steps 300 and 302, it is tested whether $T_n$ is less than $T_{TH1}$ at step 304. If so, the flag F is set to 1 at step 306. The shut-off valve is then closed in steps 308 and 310, after which control is returned to step 300. Therefore, the shut-off valve 174a will be closed at temperatures below the threshold temperature $T_{TH1}$, in order to avoid ductile to brittle transition of the steel of the pipe.

On the other hand, if $T_n$ is not less than $T_{TH1}$ in step 304, it is tested in step 312 whether $T_n$ is less than $T_{TH2}$. If so, then it is tested in step 314 whether F equals 0, i.e., whether $T_n$ has recently been below $T_{TH1}$. If not, i.e., if F equals 1 indicating that $T_n$ has recently dropped below $T_{TH1}$, the shut-off valve is maintained closed or is closed at steps 308-310. This creates a hysteresis mode which avoids quick successions of opening and closing of the shut-off valve 174a.

If it is determined at step 312 that $T_n$ is not less than $T_{TH2}$, i.e., that $T_n$ is greater than or equal to $T_{TH2}$, then F is reset to 0 in step 316 and the shut-off valve is opened in steps 318-320. Control is then returned to step 300.

It is also desirable to provide an automatic dry gas (such as nitrogen gas) purge through the whole spraying system during any shut down in the LN2 flow in order to avoid the deposition of frost on the operating portions of the nozzles 140, since such frost deposits can lead to a disruption of the spray cone, particularly in wide angle flat cone nozzles, or plugging of some or all of the nozzles. Therefore, a normally open cryogenic solenoid purge valve 210 is connected in parallel to the normally closed solenoid valve controlling the flow of compressed air to the pneumatic actuator 201. The purge valve 210 is mounted on a gas by-pass line around the valve 174a. As a result, when the shut-off valve 174a closes, the purge valve 210 automatically opens and creates a positive pressure in the nozzles 140, thereby avoiding frost deposits on the nozzles. A manual ball valve 211 is also located upstream of the valve 210 for completely shutting down the equipment.

As noted above, a comprehensive feedback type control of the spray system is not necessary because the operator of the apparatus can see immediately if the coating was successfully removed or not, and therefore if the coating was sufficiently embrittled or not. If not, the operator will raise the tank pressure or, if applicable, increase the number of tunnel sections being used and, if necessary, request a slower tunnel travel. If the removal is successful, a cost-conscious operator will lower the tank pressure and, if applicable, reduce the number of tunnel sections being used and, if possible, request a faster tunnel travel. The comprehensive control system thus is not necessary because constant and skilled human supervision is implicitly assumed.

Figure 15:
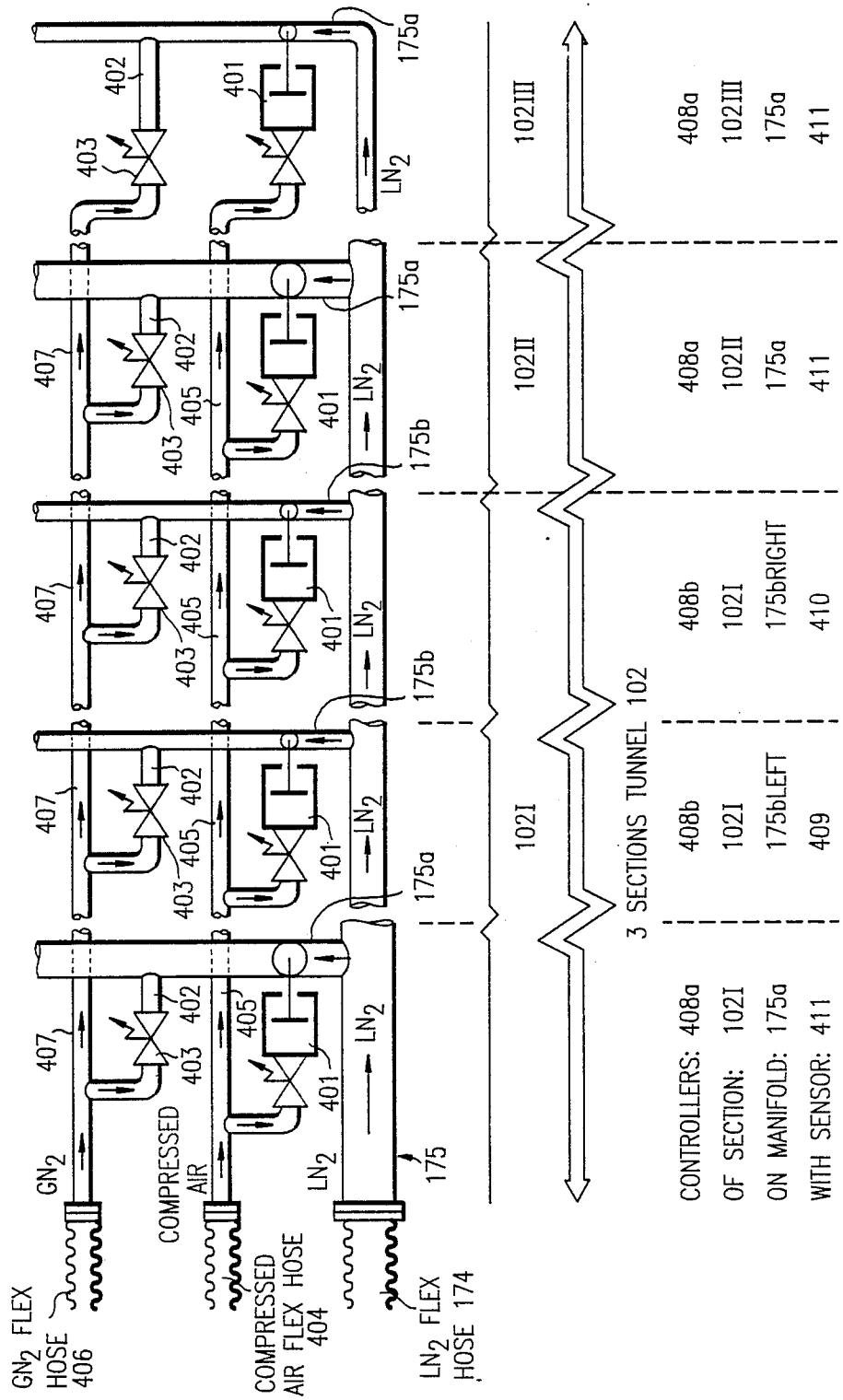
FIG. 15 is a schematic illustration of a part of a comprehensive feedback type LN2 control system.

The feedback system presently used is nonetheless desirable because, no matter how skilled the operator is, he cannot see the temperature of the pipe and cannot be expected to watch constantly the temperature readings from the temperature controller and the chart recorder. An embodiment having such a control system is described below and illustrated by FIGS. 15-22. Several modifications can be made on this system but they must all allow for the automatic closing and opening of the ball valve 177 on any of the quarter-circumferential manifolds 175a and 175b and for the automatic control of tank head pressure. As seen in FIG. 15, each of the cryogenic ball valves 177 is equipped with a spring return pneumatic actuator 401 of the same type as the spring return pneumatic actuator 201 used on the shut-off cryogenic ball valve 174a. Each of the quarter-circumferential manifolds 175a and 175b is fitted with a nipple 402 downstream of the ball valve 177. Each of the nipples 402 is fitted with a normally open solenoid valve 403 of the same type as the normally open solenoid valve 210 used for the dry gas purge system of FIG. 13.

Figure 16:
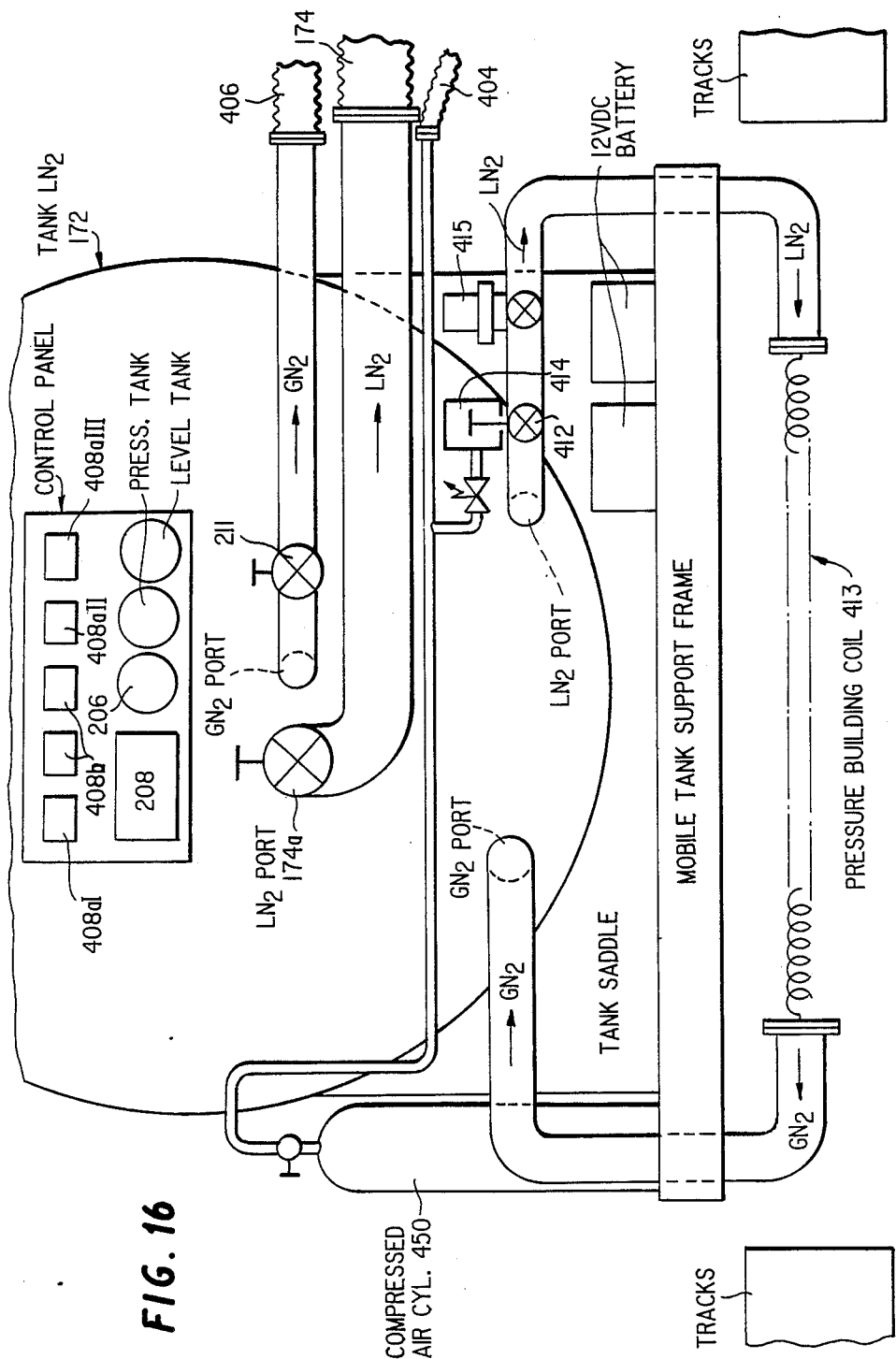
FIG. 16 is a schematic illustration of another part of the feedback control system of FIG. 15.

Referring to FIGS. 15 and 16, a compressed air hose 404 is provided between the compressed air cylinder 450 and the tunnel, following geometrically the LN2 hose 174. The compressed air hose connects to a compressed air piping 405 mounted on the tunnel following geometrically the LN2 axial pipe 175 and its manifolds 175a and 175b. The compressed air hose 404 and piping 405 supply compressed air to a normally closed solenoid valve incorporated in each pneumatic spring return actuator 401.

A dry gas (such as nitrogen) hose 406 is provided between the ball valve 211 and the tunnel, following geometrically the LN2 hose 174 and the compressed air hose 404. The dry gas hose connects to a dry gas piping 407 mounted on the tunnel following geometrically the LN2 axial pipe 175 and its manifolds 175a and 175b. The dry gas hose 406 and piping 407 supply dry gas to the normally open solenoid valve 403 on each nipple 402.

The normally open solenoid valve 403 and the normally closed solenoid valve of the pneumatic actuator 401 on each of the manifolds 175a and 175b are wired in parallel, so that the liquid nitrogen flow through the corresponding tunnel section (for manifolds 175a) or through the corresponding bottom quarter back-up spray system (for manifolds 175b) is replaced by a purge flow of dry gas whenever the corresponding ball valve 177 is closed by the actuator 401 when no voltage is applied to the solenoid of the actuator 401.

Figure 13:
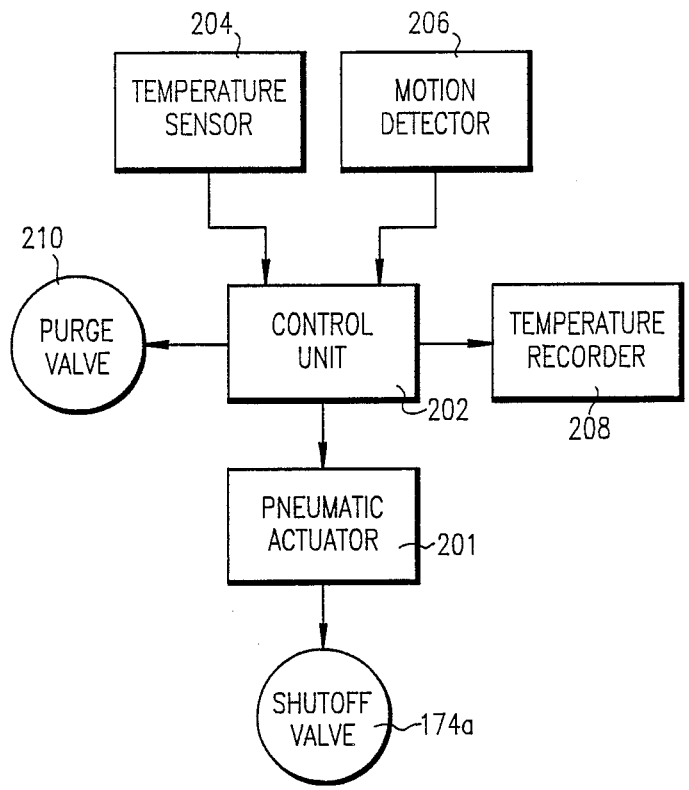
FIG. 13 is a schematic illustration of the control system.
Figure 17:
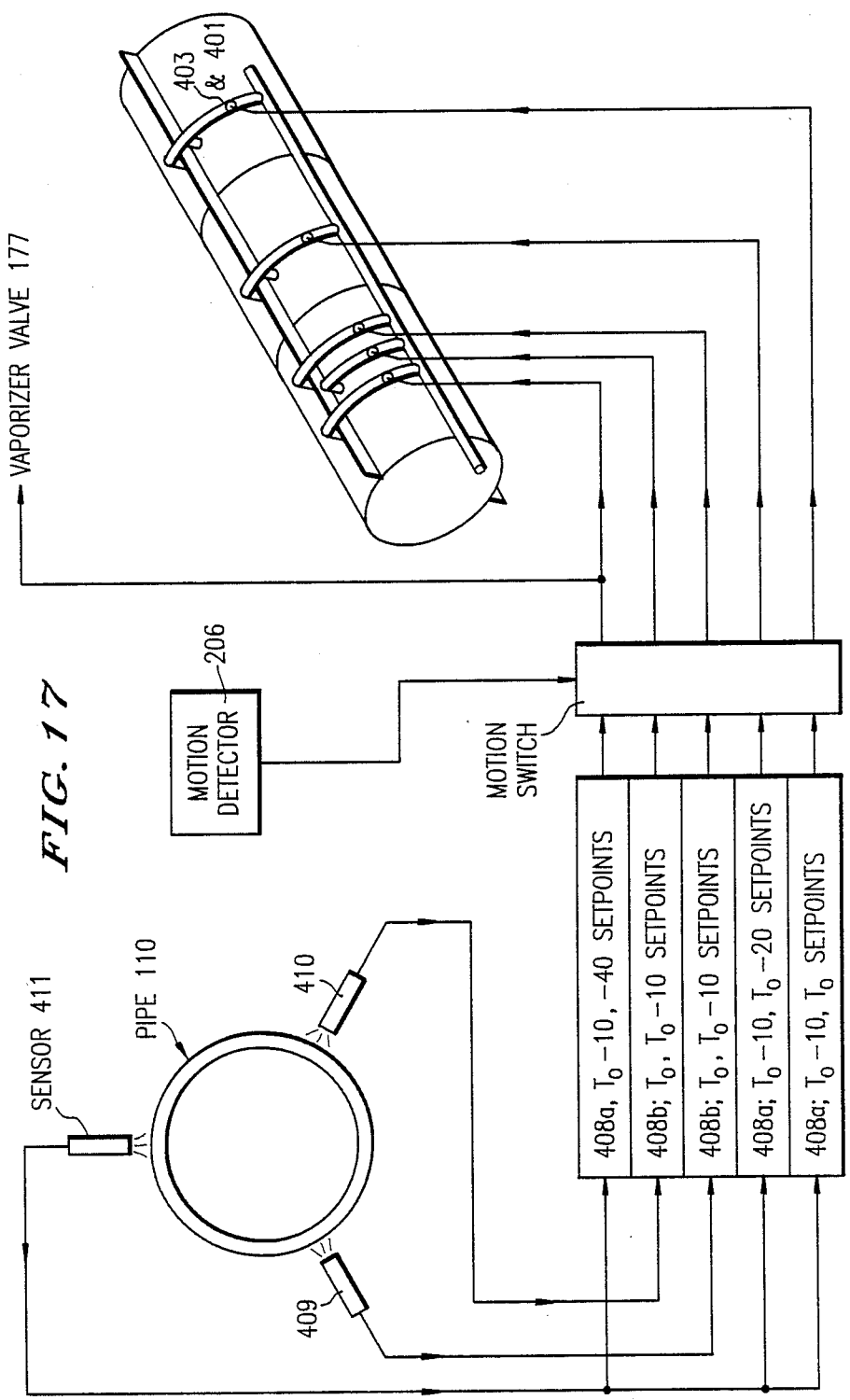
FIG. 17 shows the location of the temperature probes in the feedback control system of FIG. 15.
Figure 18A:
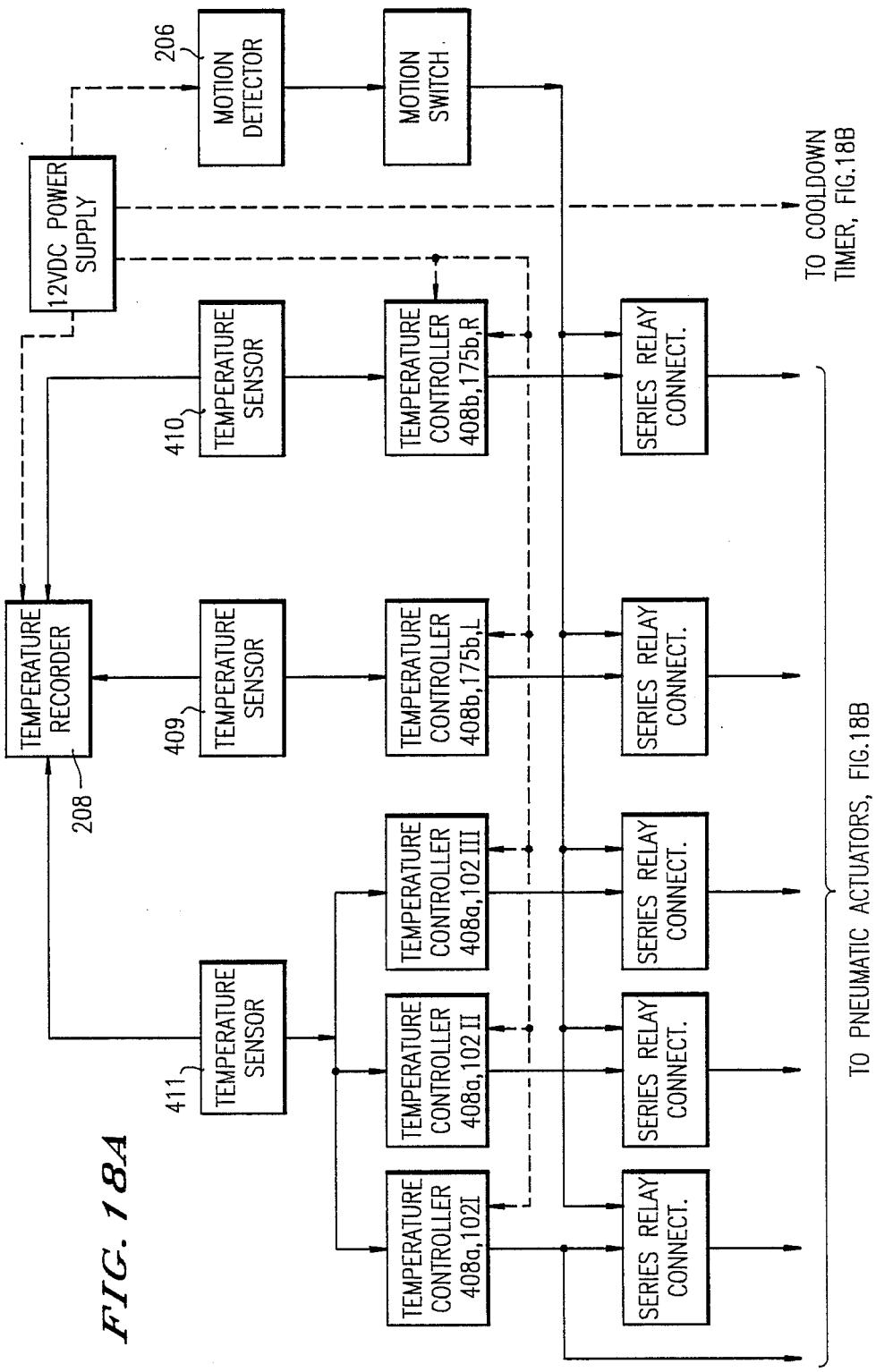
Figure 19A:
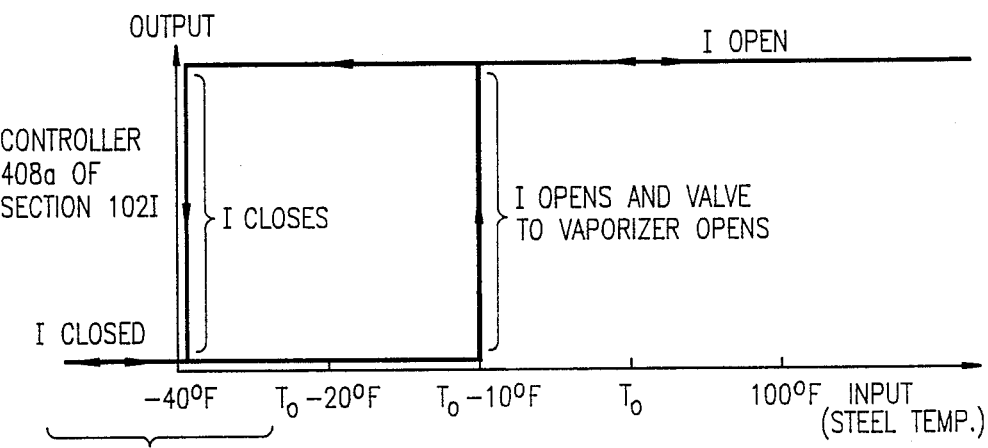
FIGS. 19A, 19B and 19C are graphs respectively illustrating the opening and closing of the valves for the nozzles in the respective tunnel sections 102I, 102II and 102III.
Figure 19B:
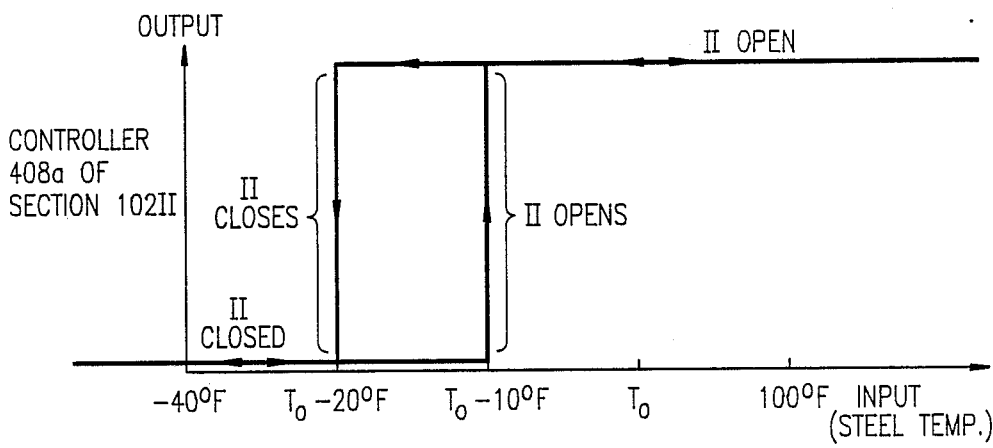
Figure 19C:
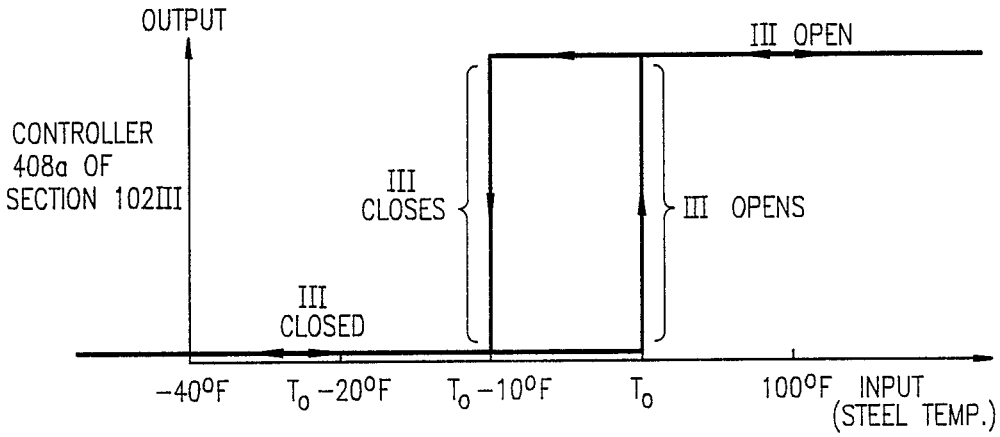

Referring to FIGS. 16 to 18(A and B), to each actuator 401 there corresponds a temperature controller 408a or 408b of the same type as the temperature controller 202 of the simplified feedback system of FIG. 13. The solenoid of the actuator 401 is electrically wired to the output relay of the controller 408a or 408b. Alternatively, all temperature controllers can be replaced by a programmable digital controller with sufficient I/O capability. Each temperature controller 408a and 408b receives as input the temperature of the pipe after passage of the tunnel and scraping device. The temperature is measured using a plurality of sensors 409–411 similar to the sensor 204. A sensor 409 is located on the left bottom quarter of the pipe. A sensor 410 is located on the right bottom quarter of the pipe. A sensor 411 is located on the top of the pipe. The controllers 408b corresponding to the manifolds 175b receive the signal from either sensor 409 or sensor 410 while the remaining controllers 408a also receive the signal from the sensor 411. Alternatively, when using a programmable controller with sufficient I/O capability, the number of temperature sensors 409, 410 and 411 can be increased and used to yield a more realistic average temperature of the top 180° of the pipe (previously done by sensor 411 alone), of the bottom left 90° of the pipe (previously done by sensor 409 alone) and of the bottom right 90° of the pipe (previously done by sensor 410 alone). These three average (respectively single) temperatures are then used by the programmable controller (respectively temperature controllers) to open or close the flow of LN2 to specific tunnel sections and/or to specific back-up spray systems.

Referring to FIGS. 19–20, the operator selects the refrigerated steel temperature $T_o$ that is optimum for successful removal of the coating, said temperature being specific to the type of coating and to its state. Controllers 408b will open the flow of LN2 to their respective back-up spray systems when the measured temperatures (from sensors 409 and 410) rise above $T_o$ and will shut off said flows when the measured temperature decreases below $T_o - 10°$ F. (hysterisis mode).

Controllers 408a will open the flow of LN2 to their respective tunnel sections according to the following sequence (FIGS. 19A, 19B, 19C):

| Temperature measured by 411 is increasing to: | Controllers open tunnel sections |
|---|---|
| above $T_o$ | 102 III |
| above $T_o$-10° F. but below $T_o$ | 102 I and 102 II |

| Temperature measured by 411 is decreasing to: | Controllers close tunnel sections |
|---|---|
| at or below -40° F. | 102 I |
| between $T_o$-10° F. and $T_o$-20° F. | 102 III |
| between $T_o$-10° F. and 40° F. | 102 II |

In addition and optionally, when the temperature of the pipe remains between $-40°$ F. and $T_o-20°$ F. ($T_o$ assumed to be greater than $-20°$ F.) although only tunnel section 102 I is spraying (102 II and 102 III having been closed by controllers 408a), controller 408a corresponding to tunnel section 102 I will close a cryogenic ball valve 412 mounted upstream of tank pressure building coil 413 (FIG. 16) using a pneumatic actuator 414 of the same type as 401. This will yield a decreasing tank head pressure in the tank, and consequently a decreasing LN2 flow rate to tunnel section 102 I, and consequently a lesser amount of refrigeration and an increasing pipe temperature. Once the pipe temperature reaches $T_o-10°$ F., controller 408a of tunnel section 102 I opens the valve 412. The valve 412 is located upstream of a standard pressure regulator 415, such as CASH ACME Type B (10 to 35 psig pressure setting range), which ensures that the tank will not be pressurized beyond a desired set value (within the 10 to 35 psig range) and which also allows the operator to fine tune the process parameters until valve 412 remains open during the processing of the coated pipe, since if valve 412 is closed, the manual setpoint on the pressure regulator 415 is too high, thereby creating more refrigeration than needed even with only section 102 I operating. A smoother pressure regulation can be obtained by using a programmable controller which also acts on a proportional valve 412b or on a ball valve 412 with a proportional control double acting pneumatic positioner actuator 414b, such as the PM15D or the G15D models of Worcester Controls or on a ball valve 412 with a proportional control electronic positioner and actuator 414c, such as the AF17 electronic positioner combined with the series 75 Actuator of Worcester Controls.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for embrittling an outer protective coating of at least a pipe section of a transmission pipeline, comprising the steps of:
   enclosing a portion of the pipe section in a pipeline travelling tunnel means so as to define an annular space around said protective coating; and
   expanding a pressurized LN2 cryogen into said space in such a way as to embrittle the protective coating throughout the thickness thereof by depositing a layer of LN2 droplets onto the coated surface of the pipe, wherein said deposition of a layer of LN2 droplets comprises spraying at least a part of said LN2 droplets onto said coating so as to form a plurality of LN2 patterns on said coating, said patterns having a surfacic coverage of less than 50% of the coating on the pipe section.

2. The process of claim 1 wherein said coverage is between 15% and 45%.

3. The process of claim 1 wherein said coverage is about 30%.

4. The process of claim 1 wherein said pipe extends substantially horizontally and at least some of said patterns on a top half of said coating are elliptical patterns having a major axis extending substantially parallel to the longitudinal axis of said tunnel means, and wherein at least some of said patterns on a bottom half of said coating are elliptical patterns having a major axis extending substantially normal to said longitudinal axis.

5. The process of claim 4, wherein the pipe extends substantially horizontally and said coating circumferentially defines a first circumferential region on top of the coated pipe adjacent a vertical plane containing the longitudinal axis of said tunnel means, two second circumferential regions, each extending from said first circumferential region to adjacent a horizontal plane containing the longitudinal axis of said tunnel means, two third circumferential regions, each extending adjacent said horizontal plane, and a fourth circumferential region extending across a bottom half of said coating between said third circumferential regions, wherein substantially all of said patterns on said second regions are elliptical patterns having a major axis extending substantially parallel to said longitudinal axis of said tunnel means, and wherein substantially all of said patterns on said fourth region are elliptical patterns having a major axis extending substantially normal to said longitudinal axis of said tunnel means.

6. The process of claim 5 wherein substantially all of said patterns on said first and third regions are elliptical patterns having major axes extending substantially 45° from said longitudinal axis of said tunnel means.

7. The process of claim 1, wherein said deposition of a layer of LN2 droplets comprises spraying LN2 droplets onto said coating from a distance of between 5 inches and 7 inches from said coating.

8. The process of claim 1, wherein said patterns are formed on said coating with a density of approximately one pattern per 75 $in^2$ of outer pipe surface.

9. The process of claim 1, wherein said LN2 droplets are sprayed at a pressure of between 14 psig and 27 psig.

10. The process of claim 4, wherein said pipe extends substantially horizontally and said deposition of a layer of LN2 droplets further comprises spraying additional LN2 droplets onto a bottom half of said coating.

11. The process of claim 10, wherein said additional LN2 droplets form a plurality of circular patterns on said coating at positions between said elliptical patterns, whereby said circular patterns do not overlap with said elliptical patterns.

12. An apparatus for embrittling an outer protective coating of a pipe, comprising:

annular tunnel means having a bore positionable in enclosing relationship with a portion of a pipe so as to define an annular space with essentially open ends around the protective coating of the enclosed portion of the pipe; and means for expanding pressurized LN2 cryogen into said bore so as to embrittle the protective coating throughout the thickness thereof, wherein said means for expanding comprises a plurality of nozzles comprising means for spraying at least a part of said LN2 cryogen so as to form a plurality of elliptical LN2 patterns on said coating.

13. The apparatus of claim 12 wherein said nozzles comprise means for forming said patterns having a surfacic coverage of less than 50% of the coating on the portion of the pipe enclosed by said tunnel means.

14. The apparatus of claim 13, wherein said pipe extends horizontally and said nozzles are oriented such that substantially all of said patterns on a top half of said coating have a major axis extending substantially parallel to the longitudinal axis of said tunnel means and substantially all of the patterns on a bottom half of said coating have a major axis extending substantially normal to said longitudinal axis.

15. The apparatus of claim 13, wherein said pipe extends substantially horizontally and said coating circumferentially defines a first circumferential region on top of the coated pipe adjacent a vertical plane containing the longitudinal axis of said tunnel means, two second circumferential regions, each extending from said first circumferential region to adjacent a horizontal plane containing the longitudinal axis of said tunnel means, two third circumferential regions, each extending adjacent said horizontal plane, and a fourth circumferential region extending across a bottom half of said coating between said third circumferential regions, wherein said nozzles are oriented such that substantially all of said patterns on said second regions have a major axis extending substantially parallel to said longitudinal axis of said tunnel means, and wherein substantially all of said patterns on said fourth region have a major axis extending substantially normal to said longitudinal axis of said tunnel means.

16. The apparatus of claim 15, wherein said nozzles are oriented such that substantially all of said patterns on said first and third regions have major axes extending substantially 45° from said longitudinal axis of said tunnel means.

17. The apparatus of claim 13, wherein said nozzles extend radially toward a center of said bore by such a distance that a tip of each of said nozzles is positioned at a distance of between 5 and 7 inches from a coating of a pipe in said bore.

18. The apparatus of claim 13, wherein said tunnel means comprise at least two rigid coaxial cylinders having different lengths.

19. The apparatus of claim 13, including backup nozzles comprising means for spraying additional LN2 droplets as a plurality of circular patterns on at least a portion of a bottom half of said coating.

20. The apparatus of claim 19, wherein said nozzles comprising means for forming elliptical patterns and said backup nozzles are independently connected to a source of subcooled LN2.

21. The apparatus of claim 13, wherein said nozzles are spaced such that said patterns are positioned on said coating with a density of approximately one pattern per 75 $in^2$ of outer pipe surface.

22. The apparatus of claim 20, wherein said backup nozzles are spaced such that said circular patterns are positioned on said coating with a density of approximately one pattern per 95 in² of outer pipe bottom half surface.

23. An apparatus for embrittling an outer protective coating of a pipe, comprising:
an annular tunnel means comprising at least two tunnel body sections of different lengths, each of said tunnel body sections comprising two semi-cylindrical insulated body halves releasably connected to one another to define a bore positionable in enclosing relationship with a portion of a pipe so as to define an annular space around the protective coating of the enclosed portion of the pipe; and
means for expanding pressurized LN2 cryogen into said bore so as to embrittle the protective coating throughout the thickness thereof, wherein said expanding means comprise nozzle means for spraying the LN2 to form on the coating patterns having a surfacic coverage of less than 50% of the coating on the portion of the pipe enclosed by said tunnel means.

24. The apparatus of claim 23, wherein said lengths are multiples of a basic spray pattern cell width of said nozzle means.

25. The apparatus of claim 24, wherein said means for expanding comprises:
a semi-circular manifold mounted to each of said semi-circular body halves, each said semi-circular manifold being connectable to a source of subcooled LN2 cryogen;
a plurality of headers connected to each of said semi-circular manifolds, said headers extending substantially parallel to a longitudinal axis of said tunnel means; and
a plurality of nozzles mounted to each of said headers, said nozzles being mutually spaced by a multiple of said basic cell width.

26. The apparatus of claim 25, wherein at least some of said headers form loops.

27. The apparatus of claim 25, wherein said tunnel means extends substantially horizontally, including backup LN2 expanding means in a bottom half of at least the longest of said tunnel body.

28. The apparatus of claim 27 wherein said backup LN2 expanding means comprises:
a semi-circular manifold mounted to each of said semi-circular body halves of at least the longest of said tunnel bodies, each said semi-circular manifold being connectable to a source of subcooled LN2 cryogen;
a plurality of headers connected to each of said semi-circumferential manifolds, said headers extending substantially parallel to the longitudinal axis of said tunnel means and placed substantially below a horizontal plane containing the longitudinal axis of said tunnel means;
a plurality of back-up nozzles mounted to each of said headers, said back-up nozzles being mutually spaced by a multiple of said basic cell width.

29. The apparatus of claim 25, including a quarter-circular manifold connecting said semi-circular manifolds to an axial manifold supplied with LN2 cryogen, further including a valve in said quarter-circular manifold adjacent said axial manifold for shutting off a flow of LN2 to the headers connected thereto.

30. The apparatus of claim 28, including two quarter-circular manifolds connecting said semi-circular manifolds to an axial manifold supplied with LN2 cryogen, further including a valve in said quarter-circular manifolds adjacent said axial manifold for shutting off a flow of LN2 to the headers connected thereto.

31. The apparatus of claim 25, including at least three of said different lengths for said tunnel body sections, whereby said manifolds and headers are sized so as to produce substantially equal pressure drops of the LN2 for each of said sections at a given elevation.

32. The apparatus of claim 23, including trap doors at the bottom of each of said tunnel body sections for removing coating debris from said bores.

33. The apparatus of claim 25, wherein said nozzles comprise flat cone, wide angle, spray nozzles of 0.043 inch orifice diameter.

34. The apparatus of claim 28, wherein said nozzles comprise full cone, wide angle, spray nozzles of 0.043 inch orifice diameter.

35. The apparatus of claim 25, wherein said semi-circular manifold for each of said body sections is sized such that an LN2 spray pressure for nozzles of each of said body sections is substantially the same at a given elevation.

36. An apparatus for embrittling an outer protective coating of a pipe, comprising:
annular tunnel means having a bore positionable in enclosing relationship with a portion of a pipe so as to define an annular space with essentially open ends around the protective coating of the enclosed portion of the pipe;
means for expanding pressurized LN2 cryogen into said bore so as to embrittle the protective coating throughout the thickness thereof; and
control means for automatically shutting off a supply of the LN2 cryogen to said expanding means when at least one of the conditions of said tunnel means being stationary with respect to a pipe in said bore and the temperature of the pipe being below a first predetermined temperature, is met.

37. The apparatus of claim 36, wherein said expanding means comprise a plurality of nozzles and conduit means connecting said nozzles to a source of subcooled LN2, and wherein said control means comprise:
a shut-off valve in said conduit means adjacent said source of LN2;
pipe temperature sensing means;
means for detecting relative motion between the pipe and said tunnel means; and
a control unit comprising means responsive to signals from said pipe temperature sensing means and said relative motion detecting means and having means for controlling said shut-off valve.

38. The apparatus of claim 37, wherein said means for controlling said shut-off valve comprises:
means for maintaining said shut-off valve open when the sensed pipe temperature is above said first predetermined temperature;
means for closing said shut-off valve when said sensed pipe temperature is below said first predetermined temperature; and
means for maintaining said shut-off valve closed when said sensed pipe temperature rises from below said first predetermined temperature to above said first predetermined temperature until said sensed temperature reaches a second predetermined temperature which is above said first predetermined temperature.

39. The apparatus of claim 37, wherein said control unit includes temperature recording means.

40. The apparatus of claim 37, including means for introducing a purging dry gas into said expanding means when said shut-off valve is closed, whereby frost deposits on said nozzles are minimized.

41. The apparatus of claim 40, wherein said purging dry gas is nitrogen gas.

42. An apparatus for embrittling an outer protective coating of a pipe, comprising:
 annular tunnel means comprised of at least two rigid coaxial cylinders having different lengths and connected end to end, said annular tunnel means defining a bore positionable in enclosing relationship with a portion of a pipe so as to define an annular space with essentially open ends around the protective coating of the enclosed portion of the pipe;
 independent means associated with each of said cylinders for expanding pressurized LN2 cryogen into said bore so as to embrittle the protective coating throughout the thickness thereof; and
 control means for automatically and individually controlling a supply of LN2 to each of said independent expanding means so as to maintain the coating temperature at a predetermined optimum coating temperature for coating embrittlement.

43. The apparatus of claim 42 including means for measuring the coating temperature.

44. The apparatus of claim 42 including three of said cylinders, wherein said control means comprise:
 means for opening a supply of LN2 to an expanding means associated with a shortest one of said cylinders when a measured coating temperature rises to said optimum coating temperature, and for closing the supply of LN2 when the measured coating temperature is reduced below said optimum coating temperature by a predetermined amount; and
 means for opening the supply of LN2 to an expanding means associated with another one of said cylinders when the measured coating temperatures rises to a temperature below said optimum coating temperature by the predetermined amount.

45. The apparatus of claim 44 including independent back up mean associated with at least one of said cylinders for expanding pressurized LN2 cryogen into said bore so as to embrittle only the bottom half of the protective coating, wherein said means for measuring the coating temperature comprises at least one temperature sensor for sensing the bottom half of the protective coating, wherein said control means includes means sensitive only to said at least one sensor for sensing the bottom half of the protective coating for individually and automatically controlling a supply of LN2 to each said at least one back up expanding means.

46. The apparatus of claim 44 including means for selectively reducing a delivery pressure of the LN2 to said expanding means in response to a measured temperature.

* * * * *